US011898758B2

(12) United States Patent
Lim et al.

(10) Patent No.: US 11,898,758 B2
(45) Date of Patent: Feb. 13, 2024

(54) COOKING APPARATUS AND METHOD OF CONTROLLING THE SAME

(71) Applicant: SAMSUNG ELECTRONICS CO., LTD., Suwon-si (KR)

(72) Inventors: Jung Soo Lim, Hwaseong-si (KR); Kyoung Mok Kim, Suwon-si (KR); Kyu Sun Lee, Suwon-si (KR); Hyun Sook Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 17/386,963

(22) Filed: Jul. 28, 2021

(65) Prior Publication Data

US 2021/0356136 A1 Nov. 18, 2021

Related U.S. Application Data

(60) Continuation of application No. 16/059,625, filed on Aug. 9, 2018, now Pat. No. 11,105,514, which is a
(Continued)

(30) Foreign Application Priority Data

Oct. 2, 2013 (KR) .................. 10-2013-0117628
Jul. 31, 2014 (KR) .................. 10-2014-0098405

(51) Int. Cl.
*F24C 14/02* (2006.01)
*F24C 15/20* (2006.01)
(Continued)

(52) U.S. Cl.
CPC .......... *F24C 14/02* (2013.01); *F24C 15/2014* (2013.01); *A21B 3/04* (2013.01);
(Continued)

(58) Field of Classification Search
None
See application file for complete search history.

(56) References Cited

U.S. PATENT DOCUMENTS 3,513,294 A    5/1970  Goolkasian
3,536,457 A   10/1970  Henderson
(Continued)

FOREIGN PATENT DOCUMENTS

DE   19606571 A1 *  8/1997  .............. F24C 14/02
EP   1669678 A1 *   6/2006
(Continued)

OTHER PUBLICATIONS

DE-19606571-A1, Aug. 1997, Partial translation (Year: 1997).*
(Continued)

*Primary Examiner* — Joseph M. Pelham
(74) *Attorney, Agent, or Firm* — STAAS & HALSEY LLP

(57) ABSTRACT

A method of controlling a cooking apparatus includes a cleaning process which includes controlling a temperature in a cooking chamber such that the temperature in the cooking chamber is maintained at a preset first temperature for a preset first time, and controlling a temperature in a cooking chamber such that the temperature in the cooking chamber is maintained at a preset second temperature higher than the first temperature for a preset second time.

15 Claims, 35 Drawing Sheets

Related U.S. Application Data division of application No. 14/497,664, filed on Sep. 26, 2014, now Pat. No. 10,060,632.

(51) Int. Cl.

| | | |
|---|---|---|
| *H05B 1/02* | (2006.01) | |
| *A21B 3/04* | (2006.01) | |
| *F24C 15/32* | (2006.01) | |
| *B01D 45/04* | (2006.01) | |

(52) U.S. Cl.
CPC .......... *B01D 45/04* (2013.01); *F24C 15/2035* (2013.01); *F24C 15/322* (2013.01); *F24C 15/325* (2013.01); *H05B 1/0263* (2013.01)

(56) References Cited

U.S. PATENT DOCUMENTS

| | | | |
|---|---|---|---|
| 3,876,556 A | 4/1975 | Laack et al. | |
| 4,113,439 A | 9/1978 | Ookubo et al. | |
| 4,381,590 A | 5/1983 | Nonnenmann et al. | |
| 4,411,675 A | 10/1983 | de Castella | |
| 5,094,222 A | 3/1992 | Fukuda et al. | |
| 5,744,104 A | 4/1998 | Sakurai et al. | |
| 5,964,211 A * | 10/1999 | Sargunam | F24C 14/02 219/413 |
| 5,994,672 A | 11/1999 | Mestnik | |
| 6,227,189 B1 | 5/2001 | Dougherty | |
| 6,232,584 B1 | 5/2001 | Meyer | |
| 6,437,294 B2 | 8/2002 | Allera et al. | |
| 6,673,136 B2 | 1/2004 | Gillingham et al. | |
| 6,864,464 B2 | 3/2005 | McWilliams | |
| 6,913,012 B2 | 7/2005 | Divett et al. | |
| 7,052,532 B1 | 5/2006 | Liu et al. | |
| 7,812,287 B2 * | 10/2010 | Kruempelmann | F24C 15/2014 219/393 |
| 7,862,640 B2 | 1/2011 | Zhang et al. | |
| 9,157,639 B2 | 10/2015 | Gallici et al. | |
| 10,670,277 B2 * | 6/2020 | Iwamoto | F24C 15/005 |
| 2002/0023911 A1 * | 2/2002 | Bales | F24C 14/02 219/400 |
| 2002/0116816 A1 | 8/2002 | Schaper | |
| 2003/0075590 A1 | 4/2003 | Caspar et al. | |
| 2004/0045949 A1 | 3/2004 | McWilliams | |
| 2004/0079355 A1 | 4/2004 | Divett et al. | |
| 2004/0104227 A1 | 6/2004 | Hoh | |
| 2004/0118392 A1 | 6/2004 | McFaden | |
| 2005/0051529 A1 | 3/2005 | Day et al. | |
| 2005/0096218 A1 | 5/2005 | Kurth et al. | |
| 2007/0217952 A1 * | 9/2007 | Kruempelmann | F24C 15/2014 422/78 |
| 2008/0053990 A1 | 3/2008 | Kruempelmann et al. | |
| 2009/0050129 A1 | 2/2009 | Robinson, Jr. | |
| 2010/0147317 A1 | 6/2010 | Fallon | |
| 2010/0326290 A1 | 12/2010 | Gallici et al. | |
| 2011/0305617 A1 | 12/2011 | Lee et al. | |
| 2013/0183215 A1 | 7/2013 | Zhang et al. | |
| 2017/0082295 A1 * | 3/2017 | Faraldi | F24C 14/005 |
| 2019/0049119 A1 * | 2/2019 | Iwamoto | C09D 5/16 |
| 2019/0120500 A1 | 4/2019 | Kim et al. | |

FOREIGN PATENT DOCUMENTS

| | | | |
|---|---|---|---|
| EP | 2354666 A2 * | 8/2011 | |
| EP | 2944881 A1 * | 11/2015 | |
| GB | 1015049 | 12/1965 | |
| JP | 2-302527 | 12/1990 | |
| JP | 2720672 | 11/1997 | |
| JP | 2000-185209 | 7/2000 | |
| JP | 2006-97923 | 4/2006 | |
| JP | 2007-107851 | 4/2007 | |
| JP | 2009-000671 | 1/2009 | |
| JP | 2010-139177 | 6/2010 | |
| JP | 2012-021693 | 2/2012 | |
| JP | 2017201232 A * | 11/2017 | |
| KR | 10-0652782 | 12/2006 | |
| KR | 10-2009-0106075 | 10/2009 | |

OTHER PUBLICATIONS

DE-19606571-A1, Aug. 1997, Bib data sheet (Year: 1997).*
Restriction Requirement, dated Mar. 29, 2017, in U.S. Appl. No. 14/497,664 (9 pp.).
Office Action, dated Sep. 6, 2017, in U.S. Appl. No. 14/497,664 (13 pp.).
Notice of Allowance, dated Apr. 25, 2018, in U.S. Appl. No. 14/497,664 (8 pp.).
JP 2720672 B2 (published version of JP-H05154059 A), Masanobu, Mar. 1998, partial translation.
Restriction Requirement, dated Jun. 15, 2020, in U.S. Appl. No. 16/059,625 (8 pp.).
Ex Parte Quayle Office Action, dated Nov. 27, 2020, in U.S. Appl. No. 16/059,625 (18 pp.).
Notice of Allowance, dated Apr. 28, 2021, in U.S. Appl. No. 16/059,625 (5 pp.).
Korean Office Action dated Apr. 23, 2020 in Korean Patent Application No. 10-2014-0098405.
U.S. Appl. No. 16/059,625, filed Aug. 9, 2018, Lim et al., Samsung Electronics Co., Ltd.

* cited by examiner (a)

Pyro-cleaning (b)

| SUBSTANCE NAME | Benzaldehyde | Nonanal | 2-Decanal,(E)- | 2-Undecanal |
|---|---|---|---|---|
| REMOVAL EFFICIENCY | 99% | 75.4% | 99% | 99% |

COOKING APPARATUS AND METHOD OF CONTROLLING THE SAME

CROSS-REFERENCE TO RELATED APPLICATIONS

This application is a Continuation of U.S. patent application Ser. No. 16/059,625, filed on Aug. 9, 2018, which is a Divisional of U.S. patent application Ser. No. 14/497,664, filed on Sep. 26, 2014, now U.S. Pat. No. 10,060,632, which issued on Aug. 28, 2018, which claims the benefit of Korean Patent Application No. 10-2013-0117628, filed on Oct. 2, 2013, and Korean Patent Application No. 10-2014-0098405, filed on Jul. 31, 2014 respectively, in the Korean Intellectual Property Office, the disclosures of which are incorporated herein by reference.

BACKGROUND

1. Field

Embodiments of the present disclosure relate to a cooking apparatus including a metal foam or a filter, and a method of controlling the same

2. Description of the Related Art

Cooking apparatuses are appliances which heat food in a cooking chamber thereof using gas or electricity. Examples of the cooking apparatuses include various products such as ovens and microwave ovens, and the ovens of them are classified into a gas oven and an electric oven according to the types of heating sources.

The cooking apparatuses cook food using heat generated while operating for a time set by a user. Due to heating characteristics of the cooking apparatuses, combustion oxide, oil mist, etc. as well as water vapor are generated on the surface of food when the food is heated, resulting in unpleasant smells during cooking. In addition, a portion of oil mist or the like generated within a range of 100 to 150° C. remains on inner walls of the cooking apparatuses. For this reason, this is a main cause of inner wall contamination and odors when the cooking apparatuses are used for a long time.

In order to periodically remove the inner wall contamination, a pyro-cleaning process which burns contaminants at a temperature of 400 to 500° C. is mainly performed. However, the pyro-cleaning process has a problem in that a great quantity of noxious gas and smoke are generated due to characteristics of burning contaminants through high-temperature heating.

SUMMARY

It is an aspect of the present disclosure to provide a cooking apparatus including a metal foam configured to collect and decompose cooking gas.

It is another aspect of the present disclosure to provide a cooking apparatus including a filter configured to collect combustion gas or smoke, and a method of controlling the same.

It is a further aspect of the present disclosure to provide a cooking apparatus having a deodorization mode to deodorize odors generated from cooking gas.

Additional aspects of the disclosure will be set forth in part in the description which follows and, in part, will be obvious from the description, or may be learned by practice of the disclosure.

In accordance with one aspect of the present disclosure, a cooking apparatus includes a main body having a cooking chamber formed therein, a vent unit configured to discharge gas in the cooking chamber to the outside of the main body, and a filter installed in at least one of the cooking chamber and the vent unit to collect gas or smoke generated in the cooking chamber, wherein the filter includes a metal sheet.

The filter may include a cylindrical member opened at upper and lower portions thereof, and a metal sheet wound in the cylindrical member about a center axis thereof.

The metal sheet may include a corrugated sheet having a pattern in the form of a plurality of peaks and valleys, and the corrugated sheet may have a structure wound in a spiral form about the center axis of the cylindrical member.

The peaks and valleys of the corrugated sheet may have a height difference of 1 mm to 5 mm.

A distance between a first peak and a second peak of the peaks or a distance between a first valley and a second valley of the valleys may be greater than a height difference between the peaks and the valleys.

The corrugated sheet may have a structure wound at a spiral angle of 50° to less than 90° about the center axis of the cylindrical member.

The metal sheet may further include a flat sheet bonded to the corrugated sheet, and the corrugated sheet and the flat sheet may be bonded to each other so as to have a structure wound in a spiral form about the center axis of the cylindrical member.

The metal sheet may include a catalyst sheet made of at least one platinum metal element selected from the group consisting of platinum (Pt), rubidium (Rd), and rhodium (Rh).

The metal sheet may include a metal oxide sheet made of at least one metal oxide selected from the group consisting of aluminum oxide ($Al_2O_3$), magnesium oxide (MgO), and copper oxide (CuO).

The cylindrical member may have a greater height than a diameter thereof.

The cylindrical member may be made of at least one selected from the group consisting of metal and ceramic.

The gas may include at least one selected from the group consisting of combustion gas and cooking gas.

The cooking chamber may include a fixing section provided to detachably attach the filter.

The fixing section may be provided at a higher position than at least one tray mounting rail mounted in the cooking chamber.

The cooking apparatus may further include a suction hole formed at one side of the cooking chamber such that the gas in the cooking chamber is introduced into the vent unit, and the filter may be fixed around the suction hole.

The filter may include at least one temperature sensor to detect blockage of the filter.

The cooking apparatus may further include a metal foam configured to collect and decompose the gas in the cooking chamber.

The cooking apparatus may further include a heating source to heat the cooking chamber, and a control unit to control the heating source such that a temperature in the cooking chamber is gradationally increased.

The control unit may control the heating source such that the temperature in the cooking chamber is maintained at a preset first temperature for a preset first time and the temperature in the cooking chamber is maintained at a preset second temperature higher than the first temperature for a preset second time.

In accordance with another aspect of the present disclosure, a method of controlling a cooking apparatus includes a cleaning process including controlling a temperature in a cooking chamber such that the temperature in the cooking chamber is maintained at a preset first temperature for a preset first time, and controlling a temperature in a cooking chamber such that the temperature in the cooking chamber is maintained at a preset second temperature higher than the first temperature for a preset second time.

Each of the first and second times may be five minutes or more.

The first temperature may have a range of 250 to 300° C.

The second temperature may have a range of 420 to 450° C.

The method may further include finally controlling a temperature in a cooking chamber such that the temperature in the cooking chamber is maintained at a preset third temperature higher than the second temperature for a preset third time by a heating source.

The third time may be thirty minutes or more.

In accordance with another aspect of the present disclosure, a cooking apparatus includes a main body having a cooking chamber formed therein, a convection flow unit including a convection heater to heat air in the cooking chamber and a convection fan to circulate the air in the cooking chamber, and a metal foam installed at a periphery of the convection flow unit to collect and decompose cooking gas contained in the air in the cooking chamber.

The metal foam may include a metal member made of at least one metal element selected from the group consisting of nickel (Ni), chrome (Cr), and iron (Fe), and a metal catalyst layer made of at least one platinum metal element selected from the group consisting of platinum (Pt), rubidium (Rd), and rhodium (Rh), the metal catalyst layer being formed on the metal member.

The cooking apparatus may further include a metal oxide layer made of at least one metal oxide selected from the group consisting of aluminum oxide ($Al_2O_3$), magnesium oxide (MgO), and copper oxide (CuO), the metal oxide layer being formed between the metal member and the metal catalyst layer.

The metal foam may be formed in a porous structure having a plurality of bubbles therein.

The bubbles may have a size of a range of 10 to 3000 micrometers.

The metal foam may have a catalyst activated at a high temperature within a range of 100 to 1000° C.

At least one of the main body, the convection heater, and the convection fan may include a support member, and the metal foam may have a mounting structure so as to be fixed to the support member.

The periphery of the convection flow unit may be an edge of the convection heater.

The convection heater and the convection fan may be installed to a rear plate of the main body, and the periphery of the convection flow unit may be between the rear plate of the main body and the convection heater and convection fan.

The periphery of the convection flow unit may include a rear plate of the main body.

The periphery of the convection flow unit may include a surface of the convection fan.

The cooking apparatus may further include a control unit to control the convection heater and the convection fan such that a contamination level in the cooking chamber is determined and a deodorization mode is performed according to the determined result.

The cooking apparatus may further include a first detection sensor to detect contaminants contained in the cooking gas, and the control unit may control the convection heater and the convection fan such that, when the contamination level in the cooking chamber is determined to be equal to or greater than a preset level as the result detected by the first detection sensor, the deodorization mode is performed.

The cooking apparatus may further include a second detection sensor to detect whether or not a cooking object is accommodated in the cooking chamber, and the control unit may control the convection heater and the convection fan such that, when the cooking object is determined to be accommodated in the cooking chamber as the result detected by the second detection sensor, the deodorization mode is not performed.

The cooking apparatus may further include a door locking device, and when the deodorization mode is performed by the control unit, a door of the cooking apparatus may be closed by the door locking device.

In accordance with another aspect of the present disclosure, a cooking apparatus includes a main body having a cooking chamber formed therein, and a convection flow unit including a convection heater to heat air in the cooking chamber and a convection fan to circulate the air in the cooking chamber, wherein the main body is formed as a metal foam configured to collect and decompose cooking gas contained in the air in the cooking chamber.

In accordance with a further aspect of the present disclosure, a cooking apparatus includes a main body having a cooking chamber formed therein, and a convection flow unit including a convection heater to heat air in the cooking chamber and a convection fan to circulate the air in the cooking chamber, wherein the convection fan is formed as a metal foam configured to collect and decompose cooking gas contained in the air in the cooking chamber.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
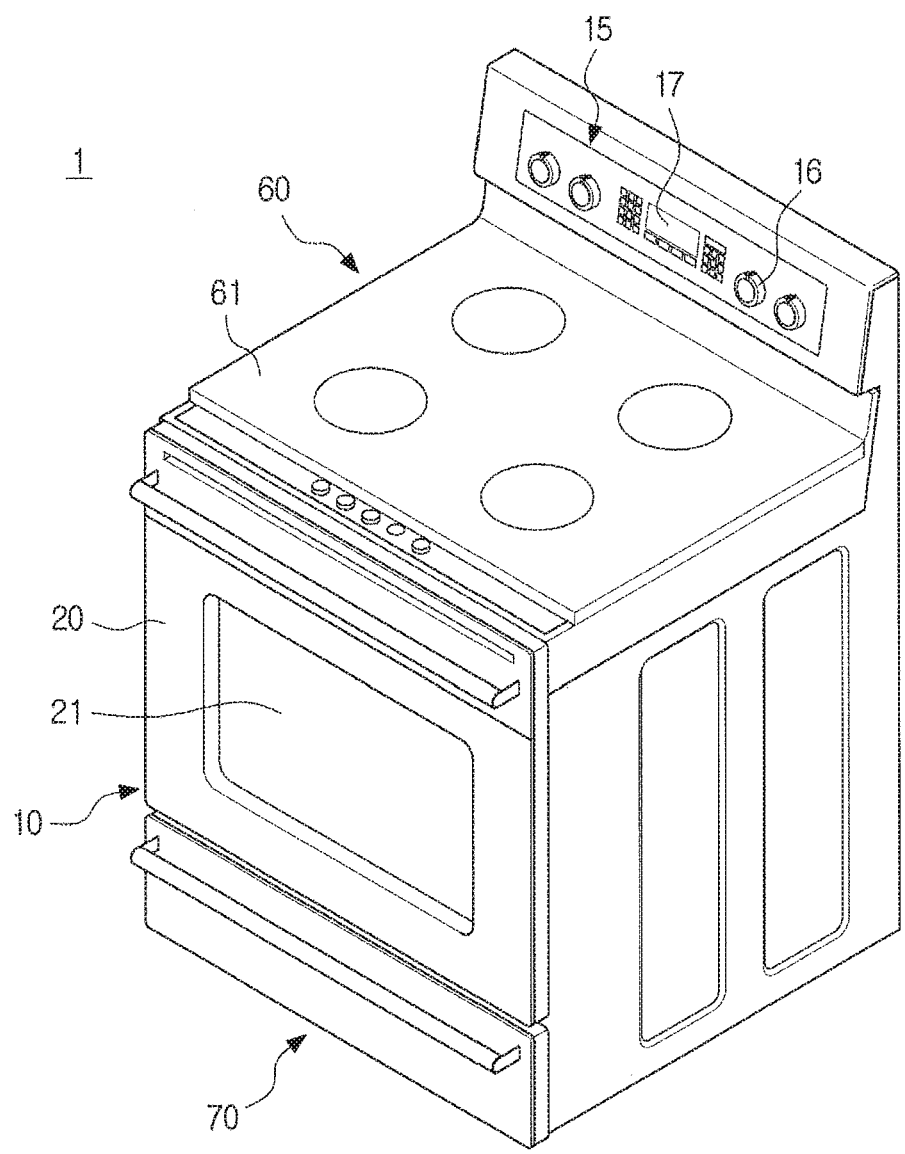
FIG. 1 is a perspective view illustrating an external appearance of a cooking apparatus according to an embodiment of the present disclosure.

It should be understood that various changes and modifications may be made at the time of filing the present application to the embodiments described in the present specification. In this context, a cooking apparatus of the specification should be understood as a broad concept encompassing an oven and a microwave oven.

The terms including ordinal numbers, such as first and/or second, used in the specification of the present disclosure may be used to describe various elements of the present disclosure, but the elements of the present disclosure should not be limited by the terms used in the specification of the present disclosure. In other words, such terms will be used only to differentiate one element from other elements of the present disclosure.

Cooking gas such as water vapor and combustion oxide and particles such as oil mist may be generated when food is cooked in the cooking apparatus. In the specification, water vapor, combustion oxide, and the like emitted in the form of gas are defined as "cooking gas".

In addition, particles such as oil mist adhere to an inner wall of a cooking chamber in the cooking apparatus, and thus the inner wall of the cooking chamber may be contaminated. Hereinafter, particles such as oil mist adhering to the inner wall of the cooking chamber are defined as "contaminants".

In addition, combustion products of many forms may be generated in a cleaning process (for instance, pyro-cleaning process) of contaminants. In the specification, combustion products such as carbon monoxide emitted in the form of gas are defined as "combustion gas", and combustion products such as carbon particles emitted in the form of particles are defined as "smoke".

Reference will now be made in detail to the embodiments of the present disclosure, examples of which are illustrated in the accompanying drawings, wherein like reference numerals refer to like elements throughout. First, a cooking apparatus including a filter will be described. Next, a cooking apparatus including a metal foam will be described. Finally, a cooking apparatus including all of the filter and the metal foam will be described.

First, a cooking apparatus including a filter and a method of controlling the same will be described.

Figure 2:
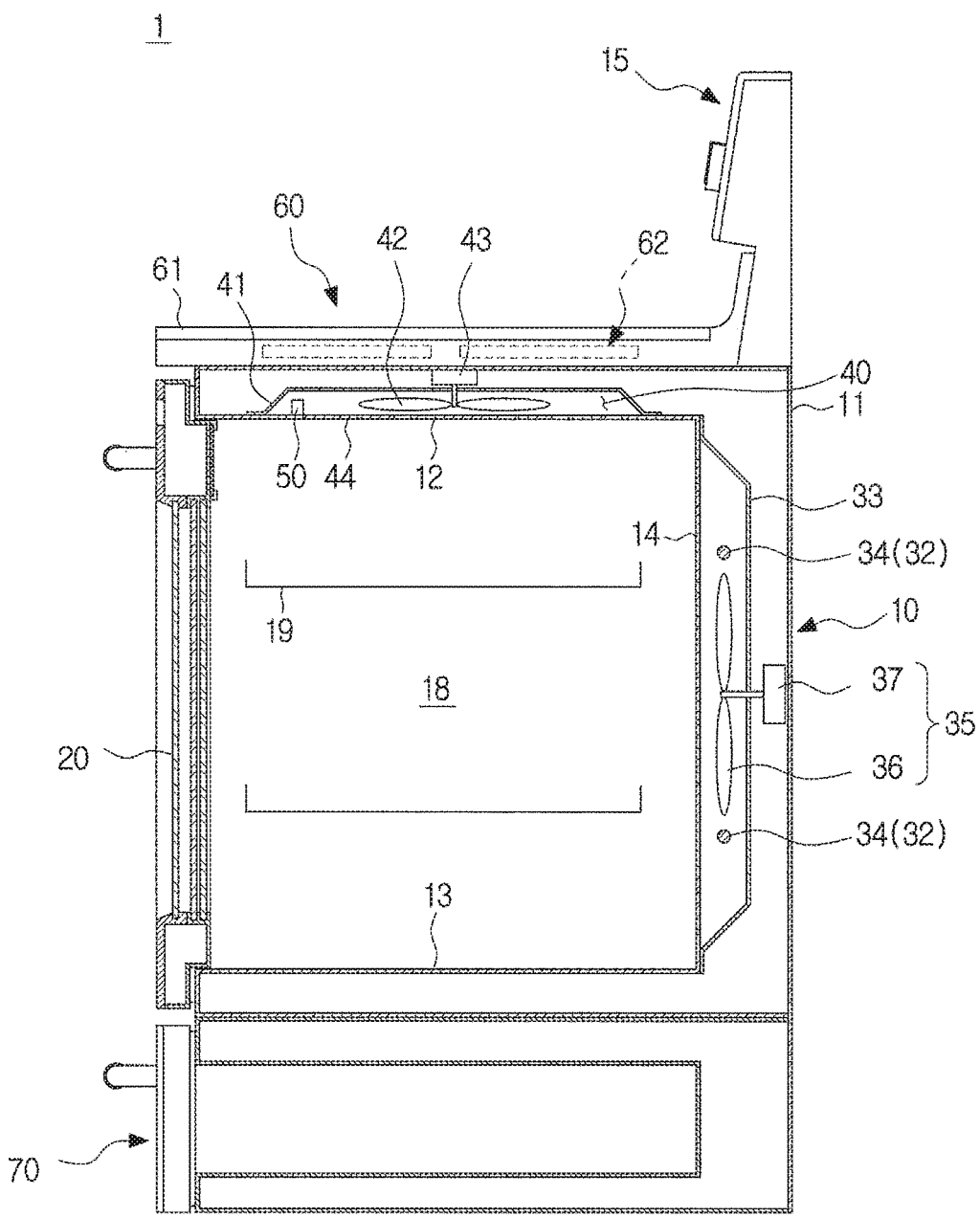
FIG. 2 is a view illustrating a configuration of the cooking apparatus of FIG. 1.

FIG. 1 is a perspective view illustrating an external appearance of a cooking apparatus 1 according to an embodiment. FIG. 2 is a view illustrating a configuration of the cooking apparatus 1 of FIG. 1.

As shown in FIGS. 1 and 2, the cooking apparatus 1 may include an oven 10 configured to heat and cook food in a state in which the food is sealed, a cooktop 60 arranged above the oven 10 such that cooking containers may be placed on the cooktop so as to cook food, and a drawer 70 arranged beneath the oven 10 so as to serve as a storage function or a simple cooking function.

The oven 10 is installed beneath the cooktop 60 to cook food using heat convection. The oven 10 includes a main body 11 having a cooking chamber 18 formed therein, a heating source (e.g., 34) to heat air in the cooking chamber 18 of the main body 11, a vent unit 40 configured to discharge gas in the cooking chamber 18 to the outside of the main body 11, and a filter 50 installed in at least one of the cooking chamber 18 and the vent unit 40 to collect gas generated in the cooking chamber 18.

A control panel 15 to control an operation of the oven 10 may be arranged above the main body 11 of the oven 10. Operation commands of the oven 10 may be input to the control panel 15 by a user and the control panel 15 may display operation information of the oven 10 for the user. The control panel 15 may include an input unit 16 to which the operation commands are input by the user and a display unit 17 configured to display the operation information of the oven 10. In more detail, the input unit 16 may include an operation mode input section to which operation commands of the oven 10 are input, a cleaning mode input section to which cleaning execution commands of the oven 10 are input, and a filter inspection mode input section configured to inspect the filter 50 of the oven 10. The display unit 17 may include an operation information display section configured to display operation information related to an operation of the oven 10, a cleaning information display section configured to display operation information related to cleaning of the oven 10, and a filter state information display section configured to display a result of inspecting the filter 50 of the oven 10.

The input unit 16 may adopt a pressure type switch or a touchpad. The display unit 17 may adopt an LCD (Liquid Crystal Display) panel or an LED (Light Emitting Diode) panel.

Although the control panel 15 shown in FIGS. 1 and 2 is separately provided with the input unit 16 and the display unit 17, the control panel 15 is not limited thereto. For example, a TSP (Touch Screen Panel) integrally provided with the input unit 16 and the display unit 17 may also be adopted.

An external appearance of the main body 11 is defined by a top plate 12, a bottom plate 13, both side plates (not shown), and a rear plate 14, and the cooking chamber 18 may be formed in the main body 11. In addition, a door 20 to open and close an opened front of the cooking chamber 18 may be disposed on a front surface of the main body 11.

Food may be inserted into or removed from the cooking chamber 18 when the cooking chamber 18 is opened, and food may be cooked according to preset values when the cooking chamber 18 is closed. A transparent window 21 may be disposed on a front surface of the door 20 in order to identify an insertion/removal state and cooked state of food.

A tray 19 may be detachably disposed in the cooking chamber 18 such that food to be cooked may be placed on the tray. Tray mounting rails (not shown) may be installed at both sides of the cooking chamber 18 so as to support the tray 19. As shown in FIG. 2, a plurality of trays 19 may be provided and at least a pair of tray mounting rails (not shown) may be provided. In particular, a plurality of pairs of tray mounting rails (not shown) may also be provided at many heights such that heights of the installed trays 19 may be adjusted variously.

The heating source is a device which supplies heat into the cooking chamber 18 such that food is cooked. The heating source may include heater modules 32 which directly apply radiant heat to food such that the food is cooked and a convection module 35 which circulates heated air such that the food is cooked.

Each of the heater modules 32 may include at least one heater 34 and the convection module 35 may include at least one convection fan 36. For example, a fan cover 33 is coupled outside the rear plate 14 of the cooking chamber 18 and the heater 34 and the convection fan 36 may be built in a rear surface of the fan cover 33. In more detail, the heater 34 may be installed at the outer periphery of the convection fan 36 and the convection fan 36 may be driven by a first fan motor 37 provided at the rear of the fan cover 33.

The vent unit 40 is a space through which gas or particles generated in the cooking chamber 18 are discharged to the outside and may be formed by coupling a fan cover 41 outside the top plate 12 of the cooking chamber 18. The vent unit 40 is equipped with an exhaust fan 42 which generates airflow to discharge air in the cooking chamber 18. A second fan motor 43 to drive the exhaust fan 42 may be installed to the rear of the exhaust fan 42.

The top plate 12 facing the exhaust fan 42 may be formed with at least one suction hole 44 through which air in the cooking chamber 18 may be introduced into the vent unit 40. The air introduced into the vent unit 40 through the suction hole 44 may be mixed with outside cold air by means of airflow formed by rotation of the exhaust fan 42 and be discharged to the outside.

The filter 50 is a device which collects combustion gas, smoke, and the like generated in the cooking chamber 18. In the cooking apparatus 1 according to the embodiment, the filter 50 may be installed in the vent unit 40. In more detail, the filter 50 may be installed around the suction hole 44 formed on the top plate 12 of the main body 11. Although FIG. 2 illustratively shows that the filter 50 is fixed such that an inlet thereof is directed toward the cooking chamber 18, the filter 50 is not limited thereto. A structure and installation position of the filter 50 will be described later.

The cooktop 60 is arranged above the oven 10 and includes a case (not shown), a cooking table 61, and cooktop heating sources 62.

The case (not shown) accommodates the cooktop heating sources 62 and a variety of components and electronic parts constituting the cooktop 60.

The cooking table 61 is disposed at an upper portion of the case (not shown) and may have a flat shape such that the cooking containers may be placed on the cooking table. The cooking table 61 may be made of a tempered glass material so as not to be easily broken or scratched.

The cooktop heating sources 62 are installed beneath the cooking table 61 so as to heat the cooking containers placed on the cooking table 61, and each of the cooktop heating sources 62 may include at least one working coil.

The drawer 70 forms a separate cooking space. A separate heating source may also be installed in the drawer 70 so as to warm up cooked food or simply cook food.

Figure 3:
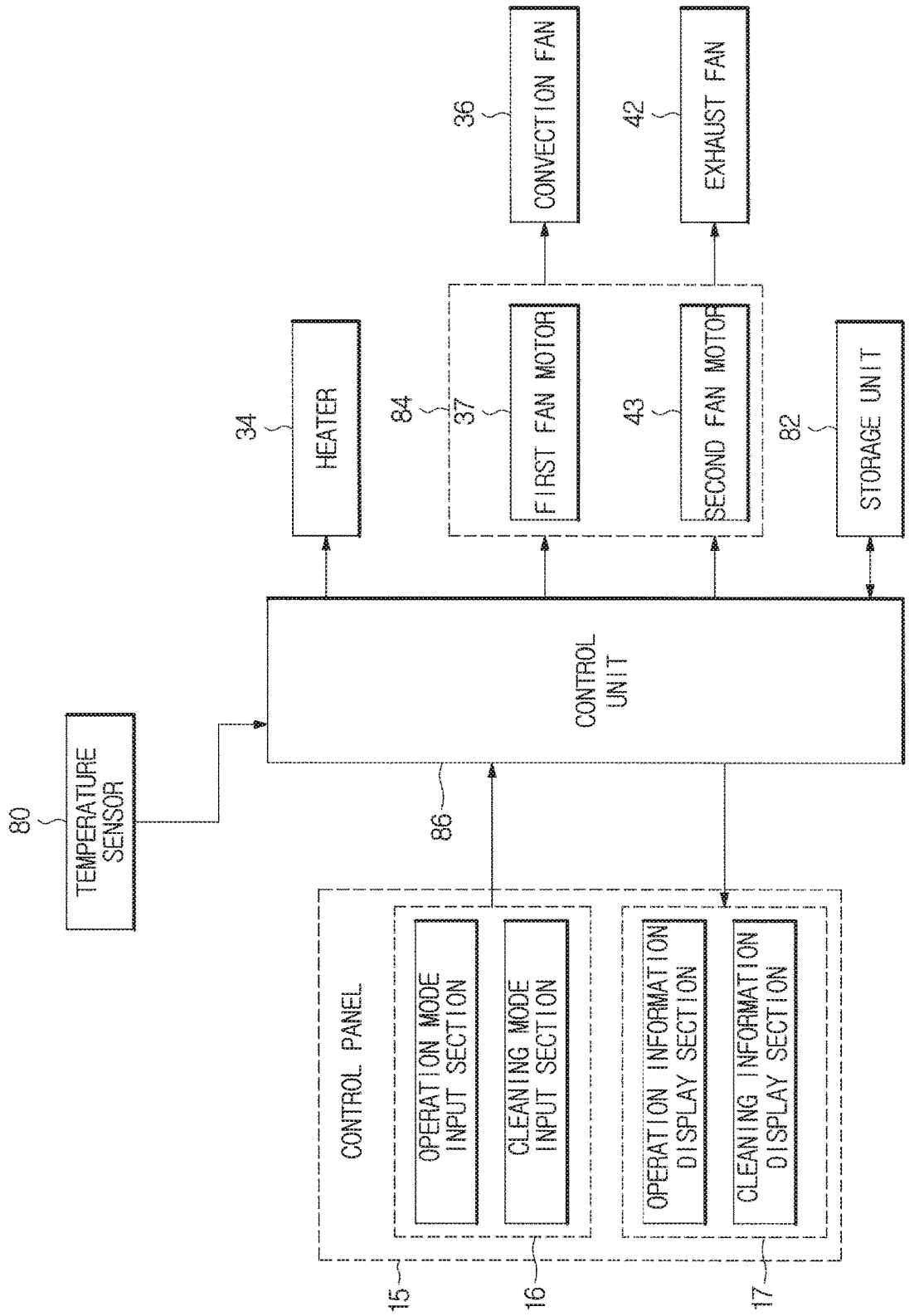
FIG. 3 is a control block diagram illustrating the cooking apparatus of FIG. 1.

FIG. 3 is a control block diagram illustrating the cooking apparatus 1 according to an embodiment.

Referring to FIG. 3, the cooking apparatus 1 according to the embodiment may include the control panel 15, a temperature sensor 80, a storage unit 82, a drive unit 84, and a control unit 86.

As described above, a variety of commands for cooking are input to the input unit 16 of the control panel 15 by the user and the display unit 17 displays a variety of cooking information for the user. For example, the input unit 16 may include an operation mode input section and a cleaning mode input section, and the display unit 17 may include an operation information display section and a cleaning information display section.

The user may set a cleaning temperature, a cleaning time, or etc. of contaminants on an inner wall of the cooking chamber 18 through the cleaning mode input section. The set cleaning temperature, cleaning time, or etc. may be identified through the display unit 17. Since the control panel 15 according to the embodiment is substantially identical to that described in FIGS. 1 and 2, the redundant description thereof will be omitted below.

The temperature sensor 80 is installed in the cooking chamber 18 to detect a temperature in the cooking chamber 18 varying according to on/off of a heater 34. The temperature sensor 80 may be installed to at least one of the top plate 12, bottom plate 13, both side plates (not shown), and rear plate 14 of the main body 11, and may periodically detect a temperature in the cooking chamber 18 until an operation mode or a cleaning mode is completed.

The temperature detected by the temperature sensor 80 is transferred to the control unit 86 and the control unit 86 controls a point of time for on/off of the heater 34 based on temperature data collected from the temperature sensor 80. Temperature detection of the temperature sensor 80 and a function of the control unit 86 based on the same will be described later.

The temperature sensor 80 may be a contact temperature sensor or a non-contact temperature sensor. Specifically, the temperature sensor 80 may be at least one of an RTD (Resistance Temperature Detector) temperature sensor using resistance variation of metal according to changes in temperature, a thermistor temperature sensor using resistance variation of semiconductor according to changes in temperature, a thermocouple temperature sensor using electromotive force generated at both ends of a junction point of two metal lines having different materials, and an IC temperature sensor using characteristics of both end voltages of a transistor and current-voltage of a P-N junction portion which vary according to temperature. However, the present disclosure is not limited thereto. Other sensors may also be used besides the above sensors so long as the temperature in the cooking chamber 18 may be detected.

The storage unit 82 may store a variety of data, programs, or applications to drive and control the cooking apparatus 1. For example, the storage unit 82 may store data such as a detection period of the temperature sensor 80, a driving temperature and time of the heater 34 in the cooking mode, and a driving temperature and time of the heater 34 in the cleaning mode. The storage unit may store programs or applications such as a control program for control of the cooking apparatus 1, a dedicated application which is initially offered from a manufacturer, or a general-purpose application downloaded from the outside.

The storage unit 82 may be a nonvolatile memory device such as ROM (Read Only Memory), PROM (Programmable Read Only Memory), EPROM (Erasable Programmable Read Only Memory), or flash memory, a volatile memory device such as RAM (Random Access Memory), or a storage device such as a hard disk or an optical disk. However, the present disclosure is not limited thereto and it may encompass changes envisaged by those skilled in the art.

The drive unit 84 outputs driving signals to each component of the cooking apparatus 1. The drive unit 84 may include the first fan motor 37 to drive the convection fan 36 and the second fan motor 43 to drive the exhaust fan 42.

The control unit 86 controls an overall operation of the cooking apparatus 1 and a signal flow between internal components of the cooking apparatus 1, and processes data. The control unit 86 may execute an OS (Operation System) and various applications stored in the storage unit 82 when input of the user or a preset condition is satisfied.

When the operation mode of the cooking apparatus 1 is input by the user, the control unit 86 may control the heater 34, the convection fan 36, and the like such that food accommodated in the cooking chamber 18 is cooked. In addition, when the cleaning mode of the cooking apparatus 1 is input by the user, the control unit 86 may control the heater 34, the convection fan 36, and the like such that the cooking chamber 18 is cleaned. Particularly, the cleaning mode may be performed according to a manual operation of the user or may also be performed through execution of the applications or the like which are previously stored in the storage unit 82.

Due to heating characteristics of the cooking apparatus 1, combustion oxide, oil mist, etc. as well as water vapor may be generated in the cooking chamber 18. A portion of oil mist or the like generated under a general cooking temperature remains on the inner wall of the cooking chamber 18. For this reason, this may be a main cause of inner wall contamination and odors in the cooking chamber 18 when the cooking apparatus 1 is used for a long time. Thus, a process of periodically cleaning contaminants may be performed so that the cooking chamber 18 may be kept clean.

In the cooking apparatus 1 according to the embodiment, a pyro-cleaning process of removing contaminants through high-temperature heating is applied as an example of cleaning processes. In the process of burning contaminants through the pyro-cleaning process, combustion gas containing carbon monoxide and smoke such as carbon particles are generated in quantity due to characteristics of burning contaminants through high-temperature heating and the combustion gas and the smoke are at one time introduced into the interior, thereby causing the user inconvenience.

Accordingly, the filter 50 is installed in the cooking apparatus 1 so that an amount of combustion gas and smoke discharged to the interior may be reduced and the temperature and operation time of the heater 34 are adjusted in the pyro-cleaning process so that an amount of combustion gas and smoke generated during cleaning may be gradationally adjusted. Hereinafter, after the structure and various application examples of the filter 50 installed in the cooking apparatus 1 are described, a method of controlling the cooking apparatus performing cleaning by the pyro-cleaning process will be described.

First, a structure of the filter 50 will be described.

Figure 4:
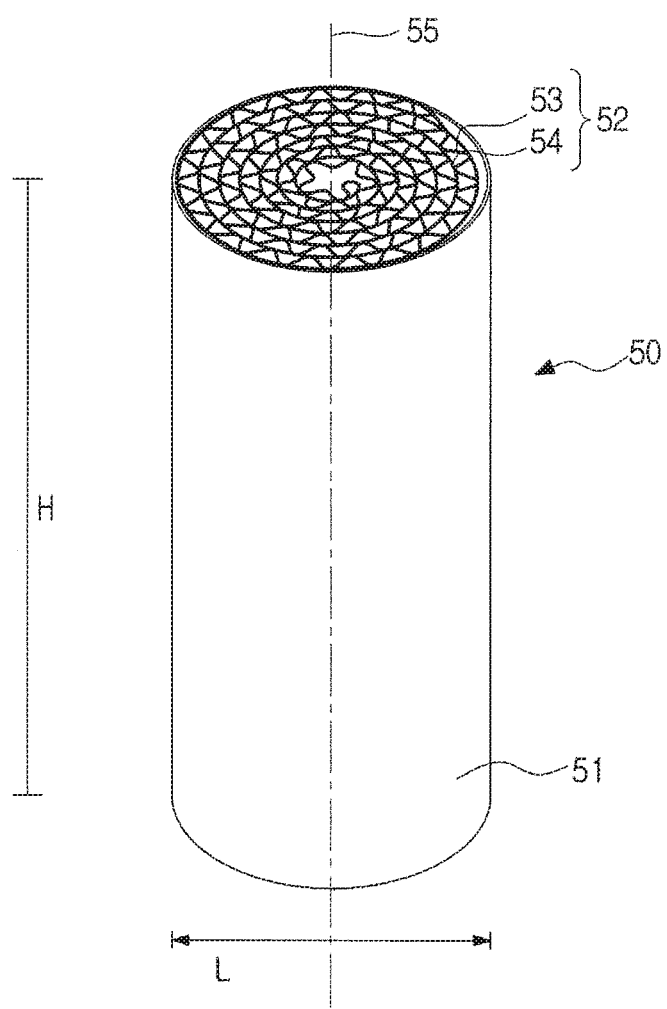
FIG. 4 is an enlarged view illustrating a filter of FIG. 2.
Figure 5:
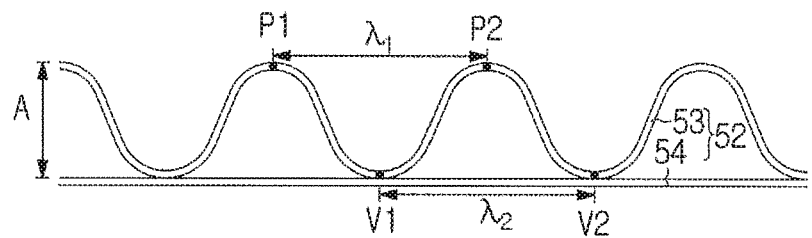
FIG. 5 is an enlarged view illustrating a cross-section of a metal member of FIG. 4.
Figure 6:
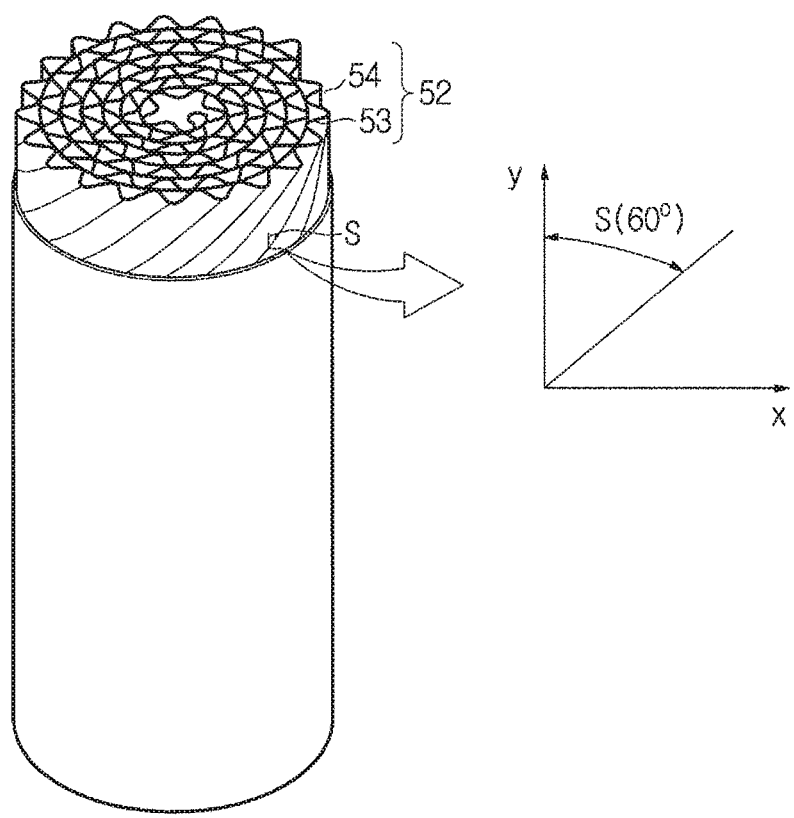
FIG. 6 is a view illustrating an example of the filter in which a corrugated sheet is wound in a cylindrical member at a spiral angle of 60° about a center axis thereof.

FIG. 4 is an enlarged view illustrating the filter of FIG. 2. FIG. 5 is an enlarged view illustrating a cross-section of a metal member of FIG. 4. FIG. 6 is a view illustrating an example of the filter 50 in which a corrugated sheet 53 is wound in a cylindrical member 51 at a spiral angle of 60° about a center axis 55 thereof.

Referring to FIGS. 4 and 5, the filter 50 according to an embodiment includes a cylindrical member 51 opened at upper and lower portions thereof, and a metal sheet 52 wound in the cylindrical member 51 about the center axis 55 thereof.

The cylindrical member 51 supports a wound structure of the metal sheet 52 and defines an external appearance of the filter 50. The cylindrical member 51 may have a greater height H than a diameter L. In addition, the cylindrical member 51 may be made of at least one ingredient selected from the group consisting of metal and ceramic.

The metal sheet 52 may include a flat sheet 54 and a corrugated sheet 53 which are each made of a metal material. In more detail, the metal sheet 52 may include the flat sheet 54 and the corrugated sheet 53 which is bonded to the flat sheet 54 and has a pattern in the form of peaks and valleys.

The corrugated sheet 53 may have a repeated pattern in which peaks and valleys having the same amplitude are periodically formed. For example, referring to FIG. 5, the corrugated sheet 53 according to an embodiment may have a pattern in which the peaks and valleys are repeatedly formed in the order of a first peak P1, a first valley V1, a second peak P2, and a second valley V2.

The peaks and valleys of the corrugated sheet 53 may have a height difference A formed within a range of 1 mm to 5 mm. A distance X1 between the first peak P1 and the second peak P2 or a distance X2 between the first valley V1 and the second valley V2 may be greater than the height difference A between the peaks and the valleys.

The metal sheet 52 has a structure wound about the center axis 55 of the cylindrical member 51. In this case, the corrugated sheet 53 may have a structure wound in a spiral form about the center axis 55 of the cylindrical member 51. In more detail, the corrugated sheet 53 may have a structure wound at a spiral angle of 50° to less than 90° about the center axis 55 of the cylindrical member 51.

Hereinafter, the spiral angle is defined as an angle at which the peak pattern or the valley pattern of the corrugated sheet 53 having the structure wound about the center axis 55 of the cylindrical member 51 is formed relative to the center axis 55 of the cylindrical member 51. For example, an angle at which the valley pattern is formed relative to the center axis 55 of the cylindrical member 51 may be defined as a spiral angle S, as shown in FIG. 6.

Referring to FIG. 6, the corrugated sheet 53 may have a structure wound at the spiral angle S of 60° in the clockwise direction about the center axis 55 of the cylindrical member 51. FIG. 6 merely shows an example of the structure in which the corrugated sheet 53 is wound at the spiral angle S about the center axis 55 of the cylindrical member 51. Therefore, the wound structure of the corrugated sheet 53 is not limited to the example of FIG. 6.

The metal sheet 52 may be modified and applied in various forms in addition to the configuration shown in FIGS. 4 to 6, and thus various modified examples of the filter 50 will be described below.

Figure 7:
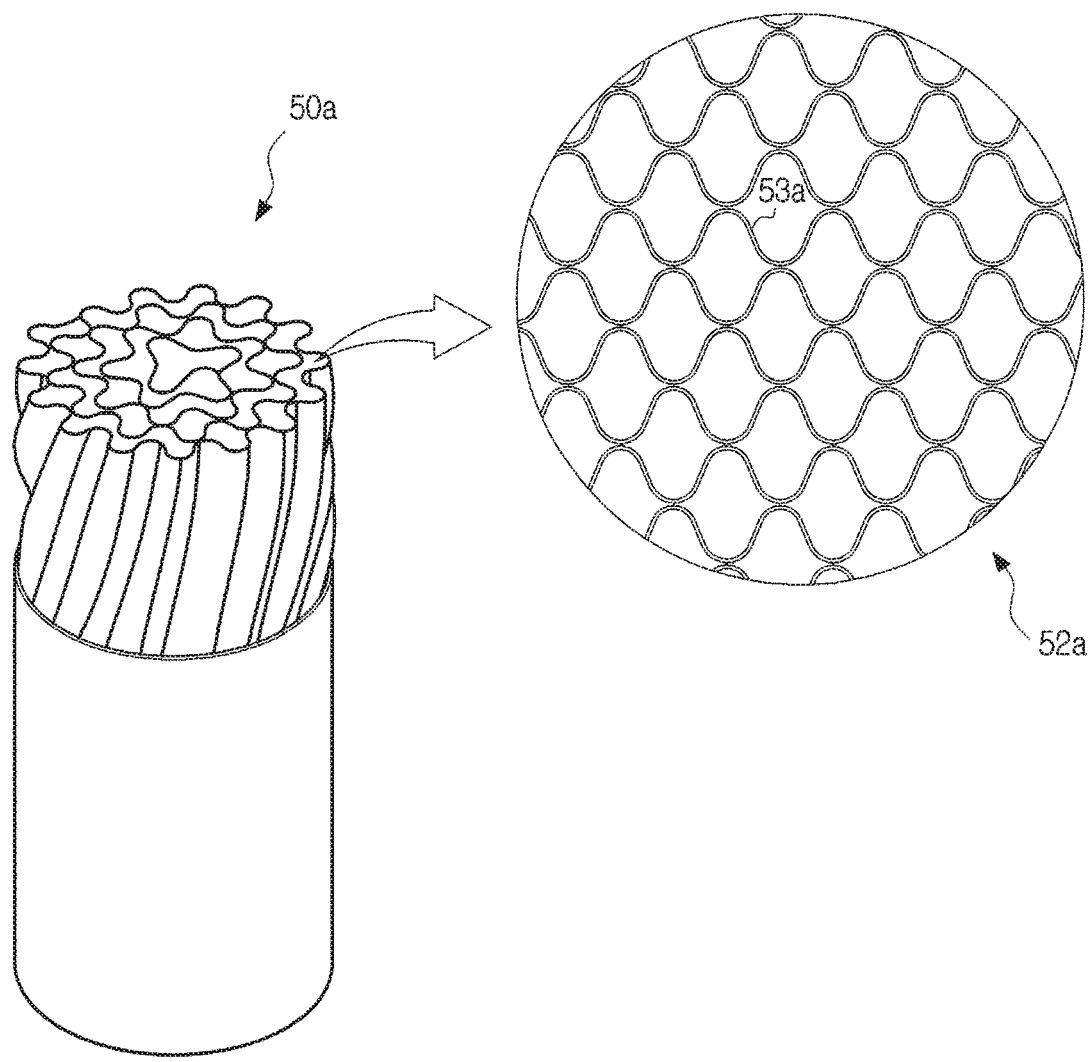
FIG. 7 is a view illustrating an example of a filter including only a corrugated sheet.
Figure 8:
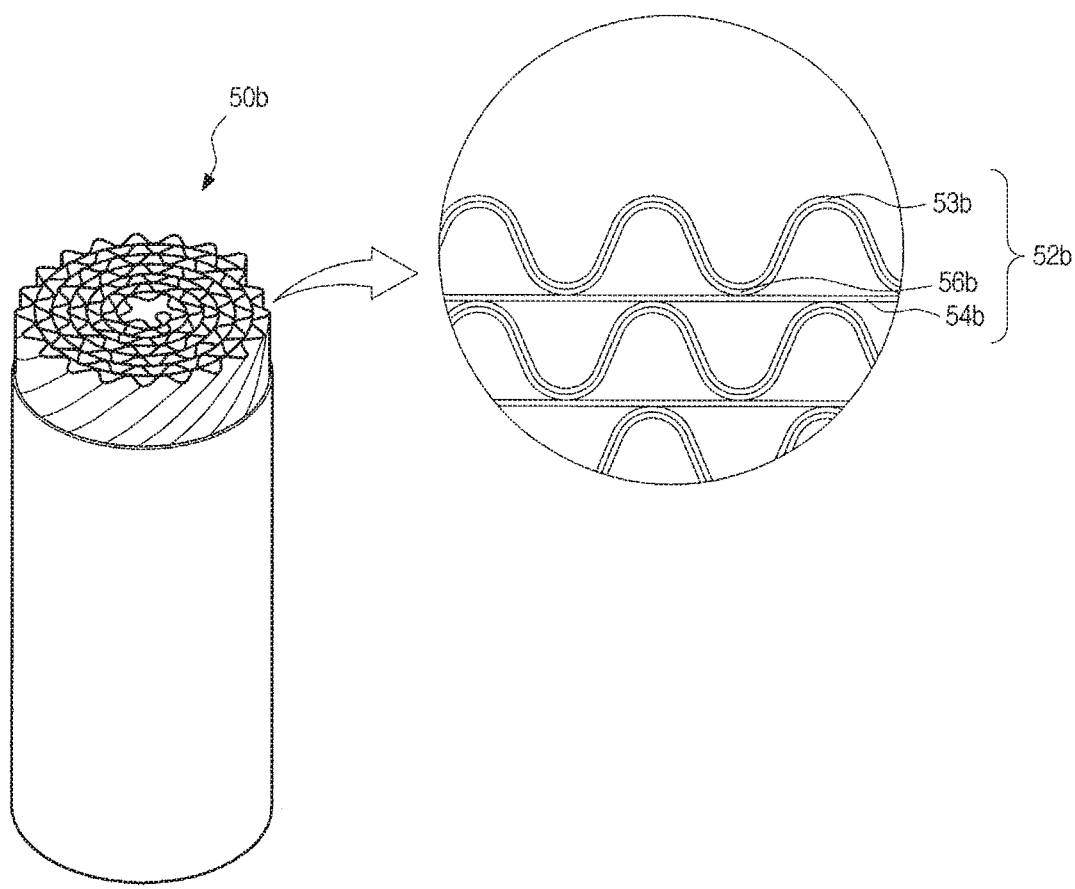
FIG. 8 is a view illustrating an example of a filter further including a catalyst sheet in addition to a corrugated sheet and a flat sheet.
Figure 9:
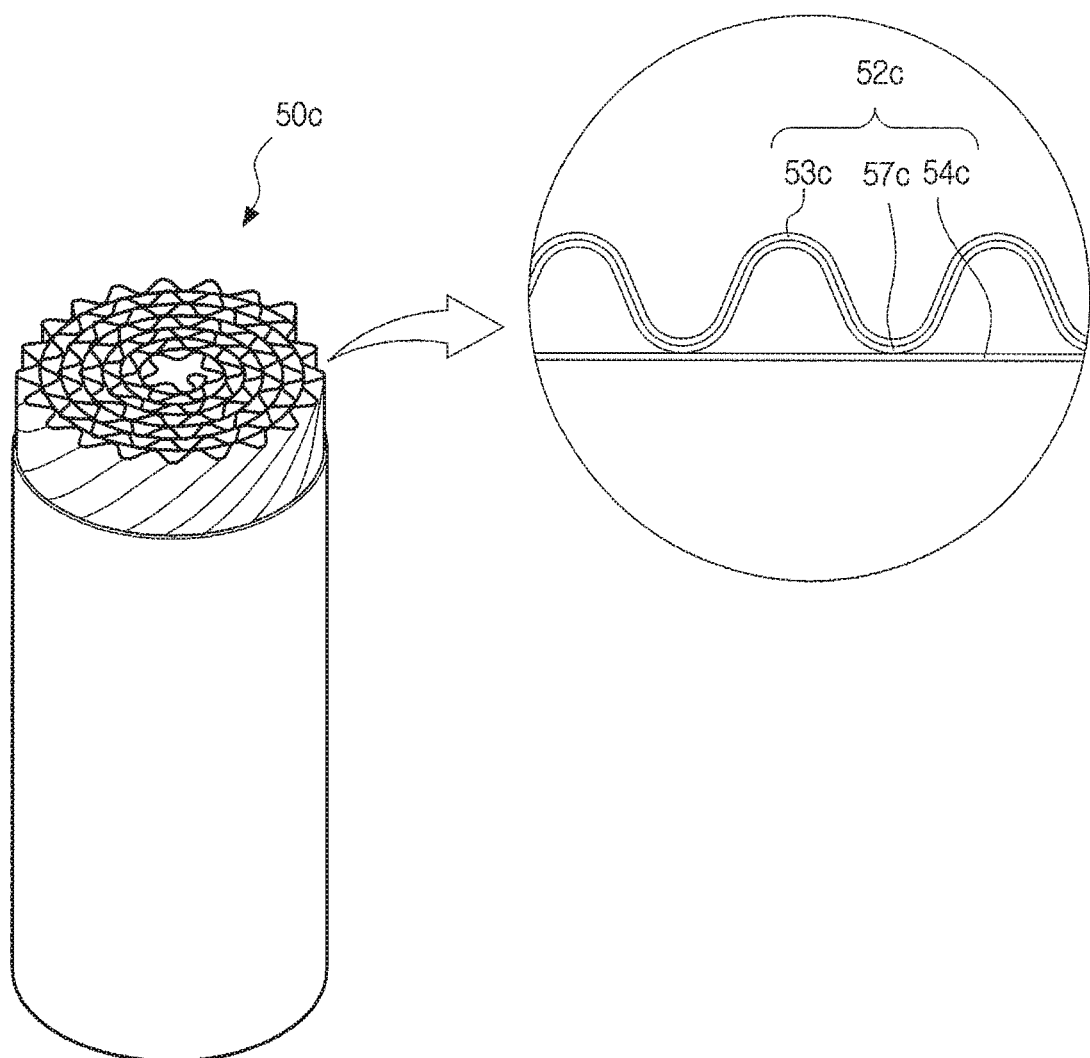
FIG. 9 is a view illustrating an example of a filter further including a metal oxide sheet in addition to a corrugated sheet and a flat sheet.
Figure 10:
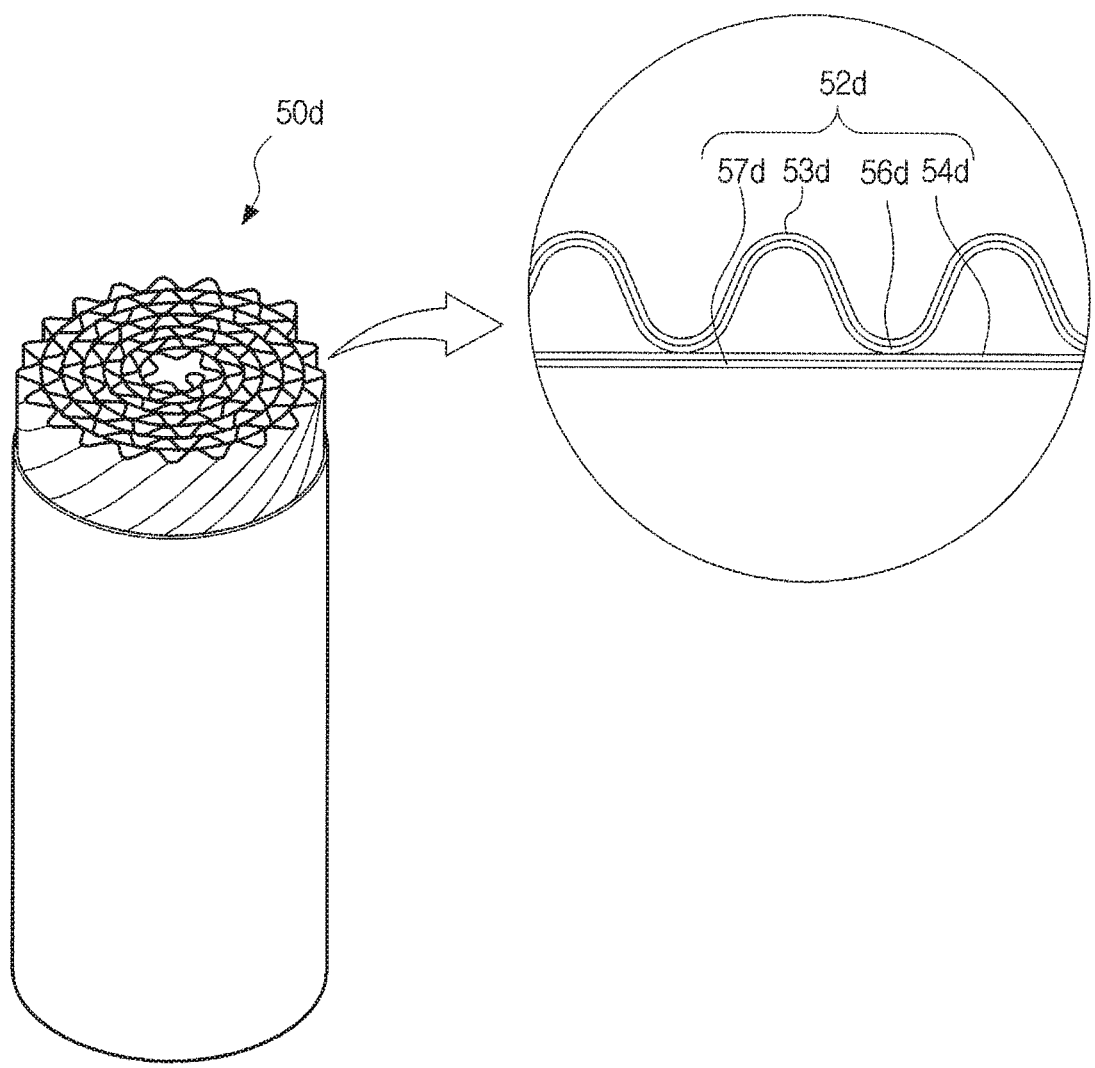
FIG. 10 is a view illustrating an example of a filter including all of a corrugated sheet, a flat sheet, a catalyst sheet, and a metal oxide sheet.

FIG. 7 is a view illustrating an example of a filter 50a including only a corrugated sheet 53a. FIG. 8 is a view illustrating an example of a filter 50b further including a catalyst sheet 56b in addition to a corrugated sheet 53b and a flat sheet 54b. FIG. 9 is a view illustrating an example of a filter 50c further including a metal oxide sheet 57c in addition to a corrugated sheet 53c and a flat sheet 54c. FIG. 10 is a view illustrating an example of a filter 50d including all of a corrugated sheet 53d, a flat sheet 54d, a catalyst sheet 56d, and a metal oxide sheet 57d.

Referring to FIG. 7, a metal sheet 52a may include only a corrugated sheet 53a having a pattern in the form of a plurality of peaks and valleys. Since the size and shape of the corrugated sheet 53a according to the embodiment are substantially identical to those described in FIGS. 4 to 6, the redundant description thereof will be omitted below.

When the metal sheet 52a includes only the corrugated sheet 53a, a filter 50a may have a wound structure in which the peaks and the valleys are formed to be in contact with each other. This is because a space in which gas is collected in the metal sheet 52a becomes smaller when the peaks and the peaks are formed to be in contact with each other.

Referring to FIG. 8, a metal sheet 52b may further include a catalyst sheet 56b in addition to a flat sheet 54b and a corrugated sheet 53b. Since the respective flat sheet 54b and corrugated sheet 53b according to the embodiment are substantially identical to those described in FIGS. 4 to 6, the redundant description thereof will be omitted below.

The catalyst sheet 56b may be coupled to one surface of the flat sheet 54b or one surface of the corrugated sheet 53b. That is, the metal sheet 52b may have a structure in which the catalyst sheet 56b, the flat sheet 54b, and the corrugated sheet 53b are sequentially formed, or a structure (see FIG. 8) in which the flat sheet 54b, the catalyst sheet 56b, and the corrugated sheet 53b are sequentially formed, or a structure in which the flat sheet 54b, the corrugated sheet 53b, and the catalyst sheet 56b are sequentially formed.

The catalyst sheet 56b may be coupled to the corrugated sheet 53b to have a large surface area such that combustion gas may be better collected in the metal sheet 52b. The catalyst sheet 56b may be made of at least one platinum metal element selected from the group consisting of platinum (Pt), rubidium (Rd), and rhodium (Rh).

Referring to FIG. 9, a metal sheet 52c may further include a metal oxide sheet 57c in addition to a flat sheet 54c and a corrugated sheet 53c. Since the respective flat sheet 54c and corrugated sheet 53c according to the embodiment are substantially identical to those described in FIGS. 4 to 6, the redundant description thereof will be omitted below.

The metal oxide sheet 57c may be coupled to one surface of the flat sheet 54c or one surface of the corrugated sheet 53c. That is, the metal sheet 52c may have a structure in which the metal oxide sheet 57c, the flat sheet 54c, and the corrugated sheet 53c are sequentially formed, or a structure (see FIG. 9) in which the flat sheet 54c, the metal oxide sheet 57c, and the corrugated sheet 53c are sequentially formed, or a structure in which the flat sheet 54c, the corrugated sheet 53c, and the metal oxide sheet 57c are sequentially formed.

The metal oxide sheet 57c may be coupled to the corrugated sheet 53c to have a large surface area such that combustion gas may be better collected in the metal sheet 52c. The metal oxide sheet 57c may be made of at least one metal oxide selected from the group consisting of aluminum oxide ($Al_2O_3$), magnesium oxide (MgO), and copper oxide (CuO).

Referring to FIG. 10, a metal sheet 52d may include all of a flat sheet 54d, a corrugated sheet 53d, a catalyst sheet 56d, and a metal oxide sheet 57d. Since the respective flat sheet 54d, corrugated sheet 53d, catalyst sheet 56d, and metal oxide sheet 57d according to the embodiment are substantially identical to those described in FIGS. 4 to 9, the redundant description thereof will be omitted below.

The cooking apparatus 1 according to an embodiment and the various modified examples 50a, 50b, 50c, and 50d of the filter 50 included in the cooking apparatus 1 have been described above. Next, a cooking apparatus 1 according to another embodiment including a filter having a blockage detection structure will be described.

Figure 11:
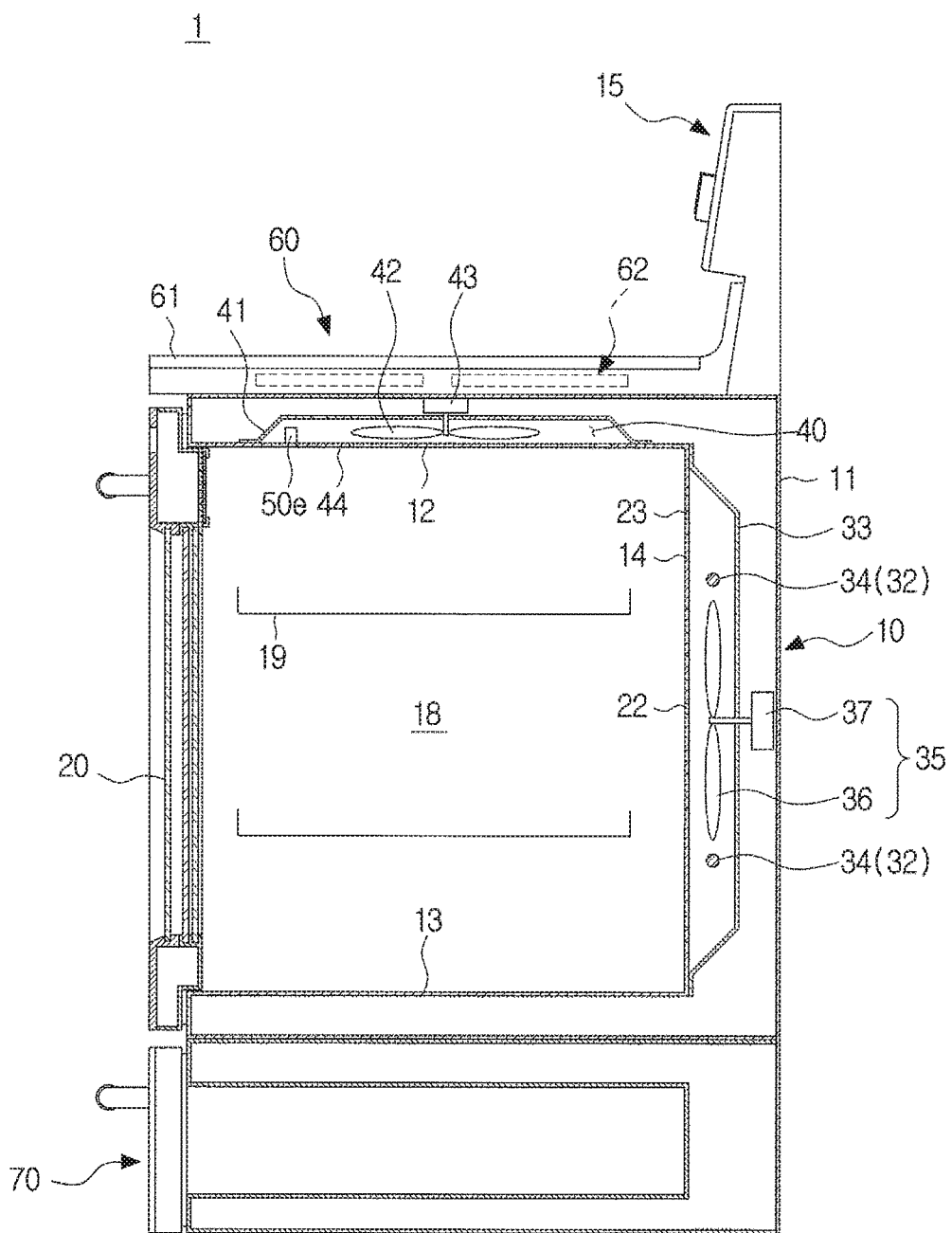
FIG. 11 is a view illustrating a configuration of a cooking apparatus including a filter having a blockage detection structure.
Figure 12:
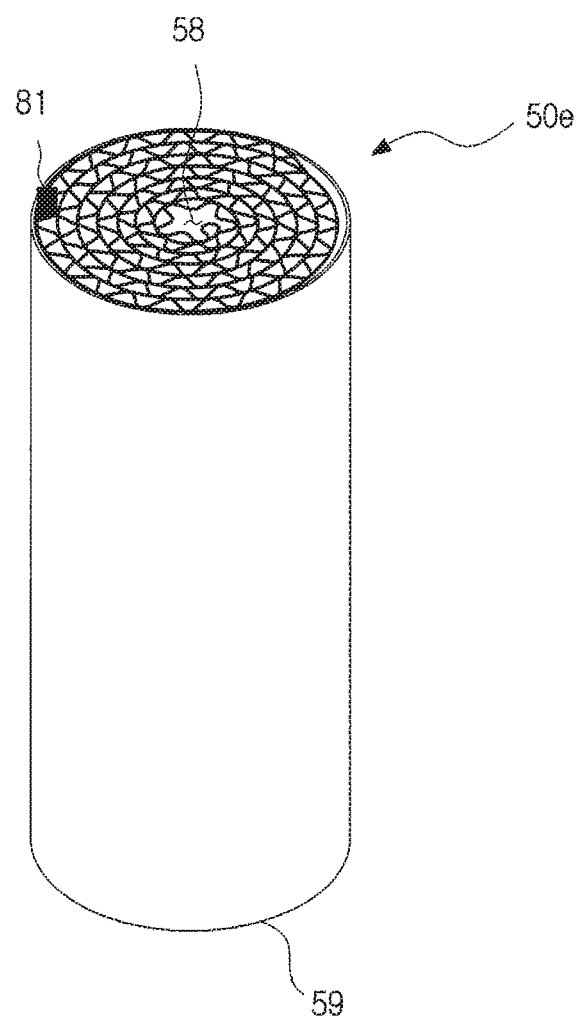
FIG. 12 is an enlarged view illustrating the filter of FIG. 11.

FIG. 11 is a view illustrating a configuration of a cooking apparatus 1 including a filter 50e having a blockage detection structure. FIG. 12 is an enlarged view illustrating the filter 50e of FIG. 11. Referring to FIG. 11, since the configuration of the cooking apparatus 1 except for the filter 50e is identical to that shown in FIGS. 1 and 2, the redundant description thereof will be omitted below.

Referring to FIG. 12, the cooking apparatus 1 includes the filter 50e having the blockage detection structure. When the filter 50 is repeatedly used, particles such as smoke are adsorbed to the filter 50, thereby decreasing performance of the filter 50. For this reason, when the filter 50 is determined to be blocked after a predetermined period elapses, the filter 50 need be cleaned or replaced. Thus, the cooking apparatus 1 according to the embodiment adopts the filter 50e having the blockage detection structure so that the user may identify a time to replace the filter and the like.

A temperature sensor 81 may be adopted as an example of the blockage detection structure. The temperature sensor 81 may be installed around a discharge section 58 of the filter 50 to collect a temperature of gas passing through the filter 50. The collected temperature data of the discharge section 58 may be transferred to the control unit 86 so that the control unit 86 determines whether or not the filter 50 is blocked.

For example, when the filter 50 normally operates without blockage, a temperature difference between the discharge section 58 and an introduction section 59 of the filter 50 is not present or the introduction section 59 has a slightly higher temperature than the discharge section 58. However, when the filter 50 is blocked by a certain amount of particles, a difference between a temperature of air discharged through the discharge section 58 and a temperature of combustion gas heated in the combustion process in the cooking chamber 18 is increased.

That is, when a temperature difference between both ends of the filter 50 is equal to or less than a preset reference value, the filter 50 is determined to normally operate. When the temperature difference between both ends of the filter 50 is equal to or greater than the preset reference value, the filter 50 is determined to be blocked.

Figure 14:
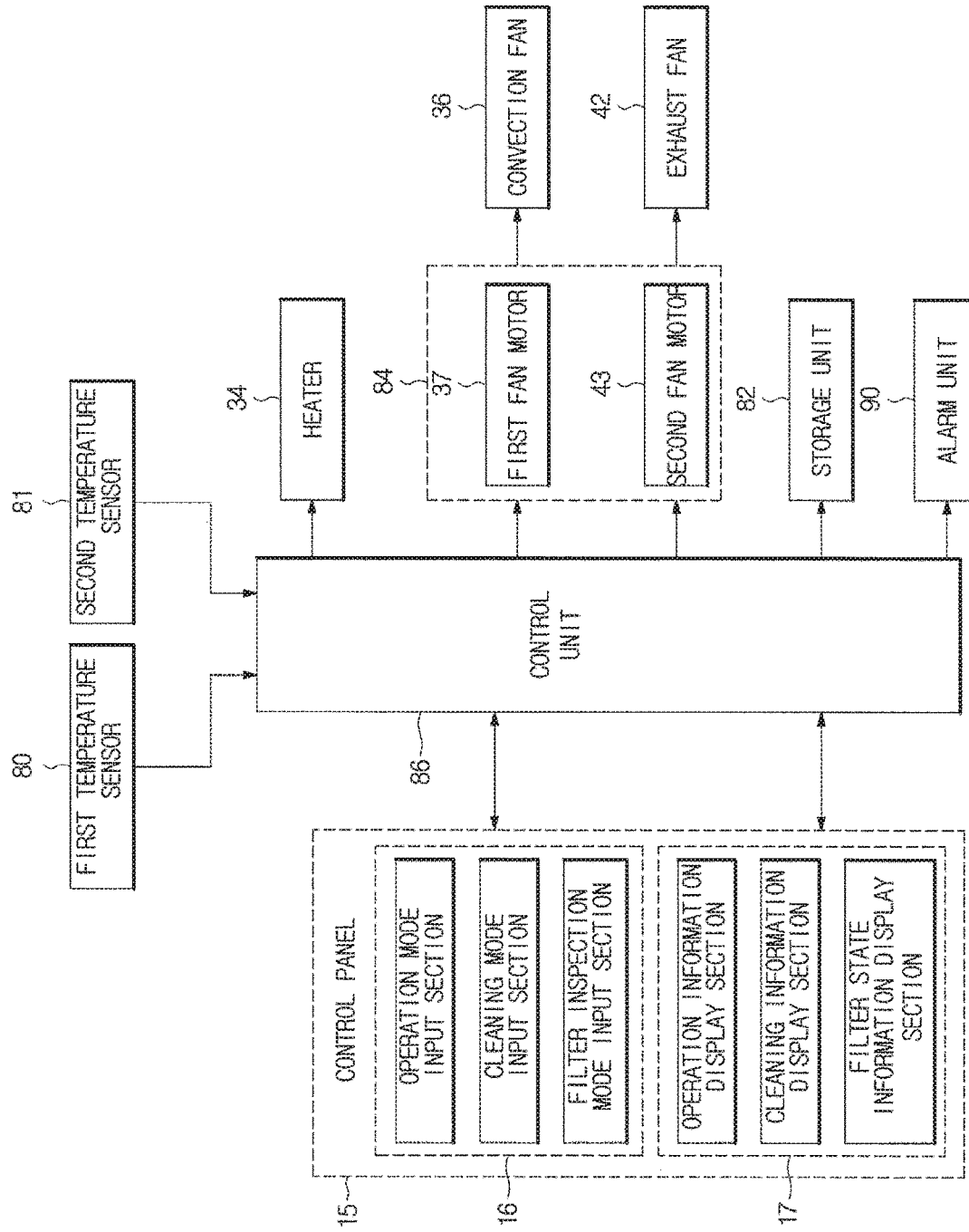
FIG. 14 is a control block diagram illustrating a cooking apparatus further including an alarm unit in addition to a temperature sensor.

The cooking apparatus 1 may further include an alarm unit 90 (see FIG. 14). When the filter 50 is determined to be blocked, the alarm unit 90 may notify the user of a replacement time or cleaning time of the filter 50.

Figure 13:
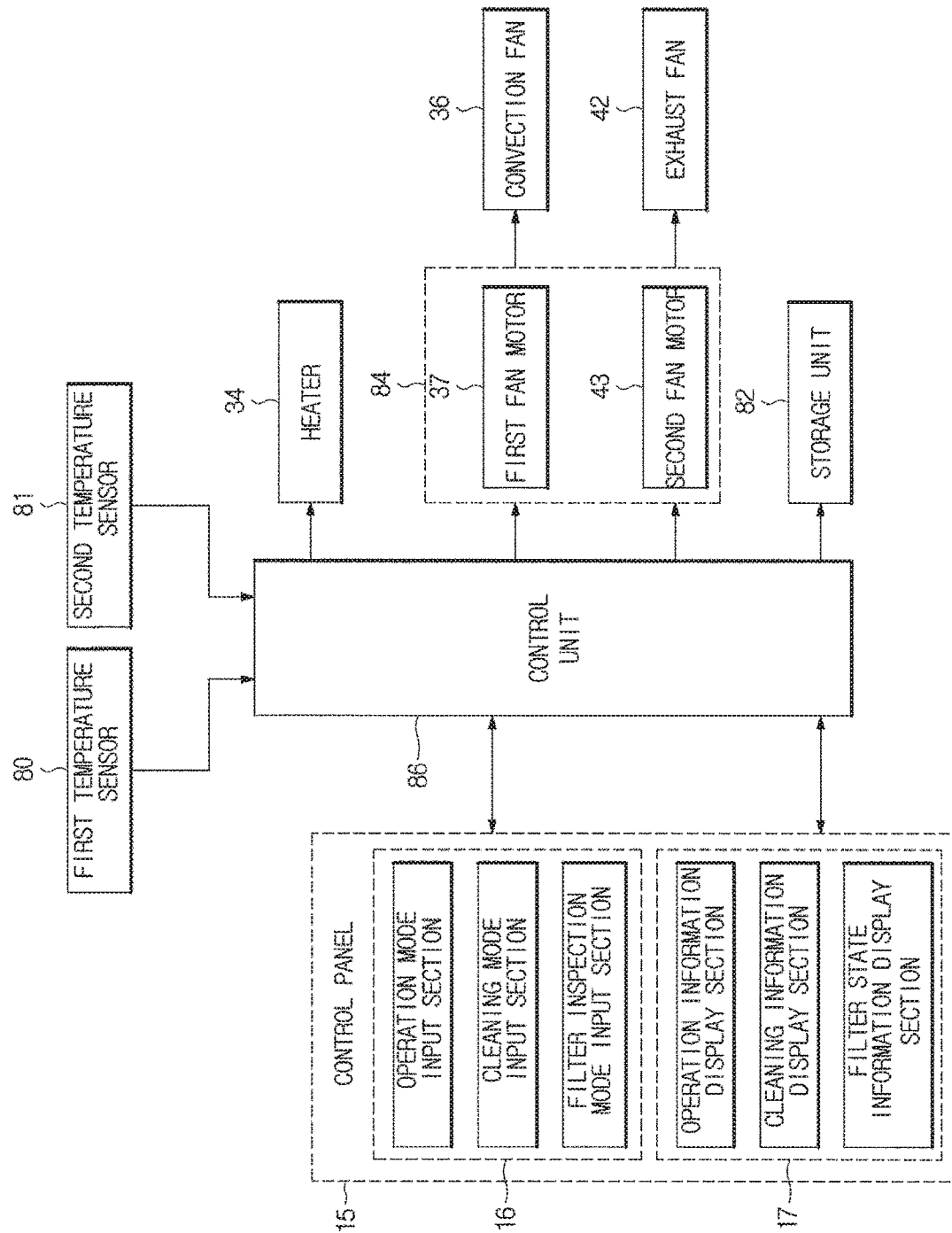
FIG. 13 is a control block diagram illustrating the cooking apparatus of FIG. 11.

FIG. 13 is a control block diagram illustrating the cooking apparatus 1 including the filter 50 in which the temperature sensor 81 is installed in the discharge section 58. FIG. 14 is a control block diagram illustrating the cooking apparatus 1 according to an embodiment further including the alarm unit 90 in addition to the temperature sensor 81.

Referring to FIG. 13, the cooking apparatus 1 according to an embodiment may further include the temperature sensor 81 installed in the discharge section 58 of the filter 50 in addition to the configurations of FIG. 13. Hereinafter, a temperature sensor installed in the cooking chamber 18 is referred to as "a first temperature sensor 80" and a temperature sensor installed in the discharge section 58 of the filter 50 is referred to as "a second temperature sensor 81", for the purpose of distinguishing them from the temperature sensor 80 of FIG. 3.

Since the input unit 16, the display unit 17, the heater 34, the convection fan 36, the exhaust fan 42, the first temperature sensor 80, the storage unit 82, the drive unit 84, and the control unit 86 are substantially identical to those described in FIG. 3, the redundant description thereof will be omitted below.

The second temperature sensor 81 collects a temperature of air passing through the filter 50 and outputs the collected temperature to the control unit 86. Similarly to the first temperature sensor 80, the second temperature sensor 81 may be a contact temperature sensor or a non-contact temperature sensor.

When a temperature difference detected by the first and second temperature sensors 80 and 81 is determined to be equal to or less than a preset temperature difference, a message notifying that the filter 50 normally operates may be output onto the filter state information display section. When the temperature difference detected by the first and second temperature sensors 80 and 81 is determined to be equal to or greater than the preset temperature difference, a message notifying that the filter 50 is blocked or broken may be output onto the filter state information display section.

Referring to FIG. 14, the cooking apparatus 1 according to an embodiment may further include the alarm unit 90. Since the input unit 16, the display unit 17, the heater 34, the convection fan 36, the exhaust fan 42, the first temperature sensor 80, the second temperature sensor 81, the storage unit 82, the drive unit 84, and the control unit 86 are substantially identical to those described in FIG. 3, the redundant description thereof will be omitted below.

When the temperature difference detected by the first and second temperature sensors 80 and 81 is equal to or greater than the preset temperature difference, the control unit determines that the filter 50 is blocked. Consequently, the control unit 86 may perform an operation of notifying the user of blockage of the filter 50 through the alarm unit 90. For example, the control unit 86 may output an alarm message of notifying of a replacement time or cleaning time of the filter 50 onto the display unit 17 or may output the replacement time or cleaning time in a voice form.

The cooking apparatus 1 including the filter 50 having the temperature sensor as the blockage detection structure has been described above.

Next, various embodiments of installation positions of the filter 50 in the cooking apparatus 1 will be described.

The filter 50 may be installed on a path through which combustion gas in the cooking chamber 18 is discharged to the outside. In more detail, the filter 50 may be installed in the cooking chamber 18 or in the vent unit 40. FIGS. 2 and 11 illustratively show that the filter 50 is installed in the vent unit 40. The following description will be given with respect to a filter 50 being installed in the cooking chamber 18 and a filter 50 being installed in each of the cooking chamber 18 and the vent unit 40.

Figure 15:
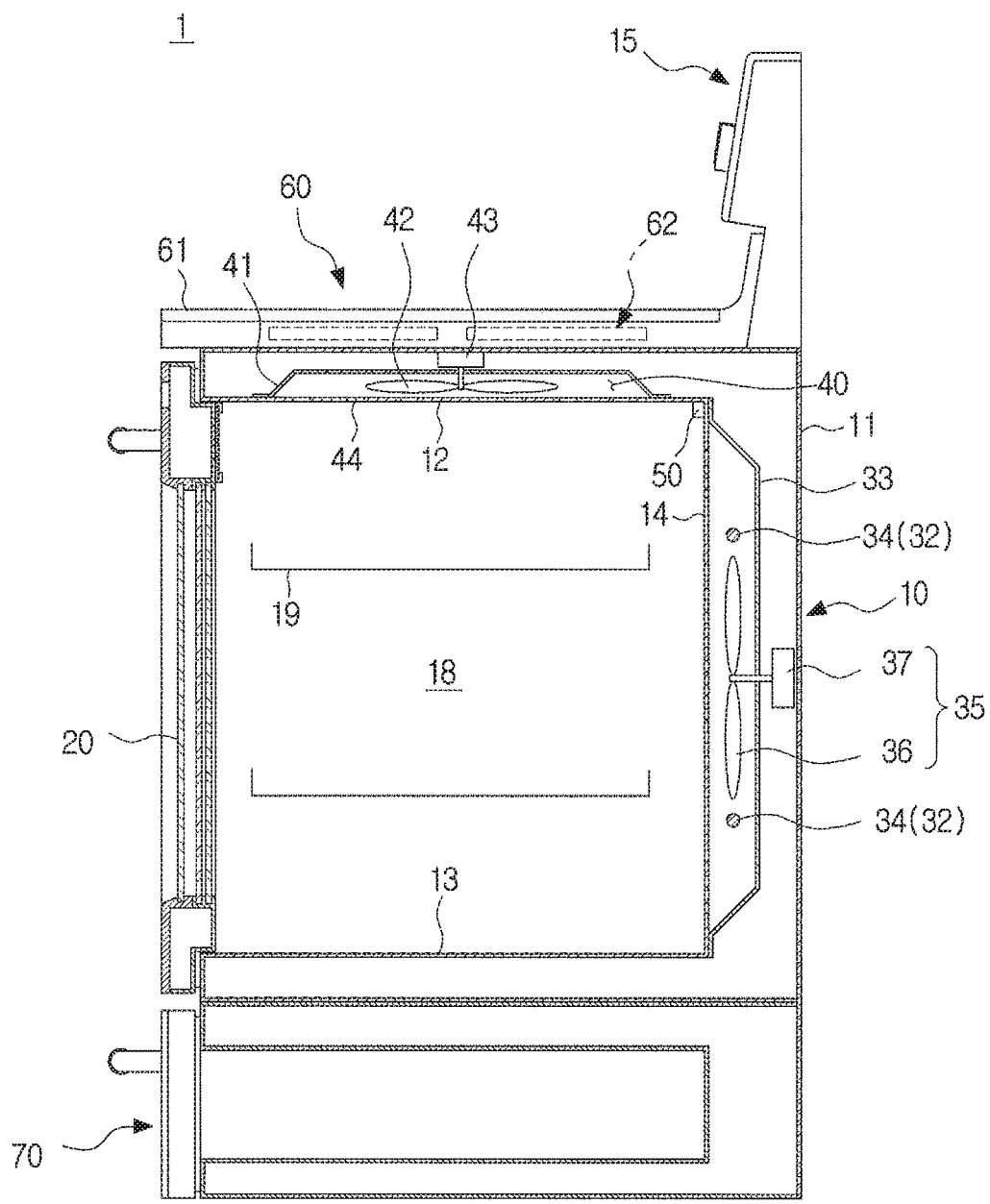
FIG. 15 is a view illustrating an example in which a filter is installed in a cooking chamber.
Figure 16:
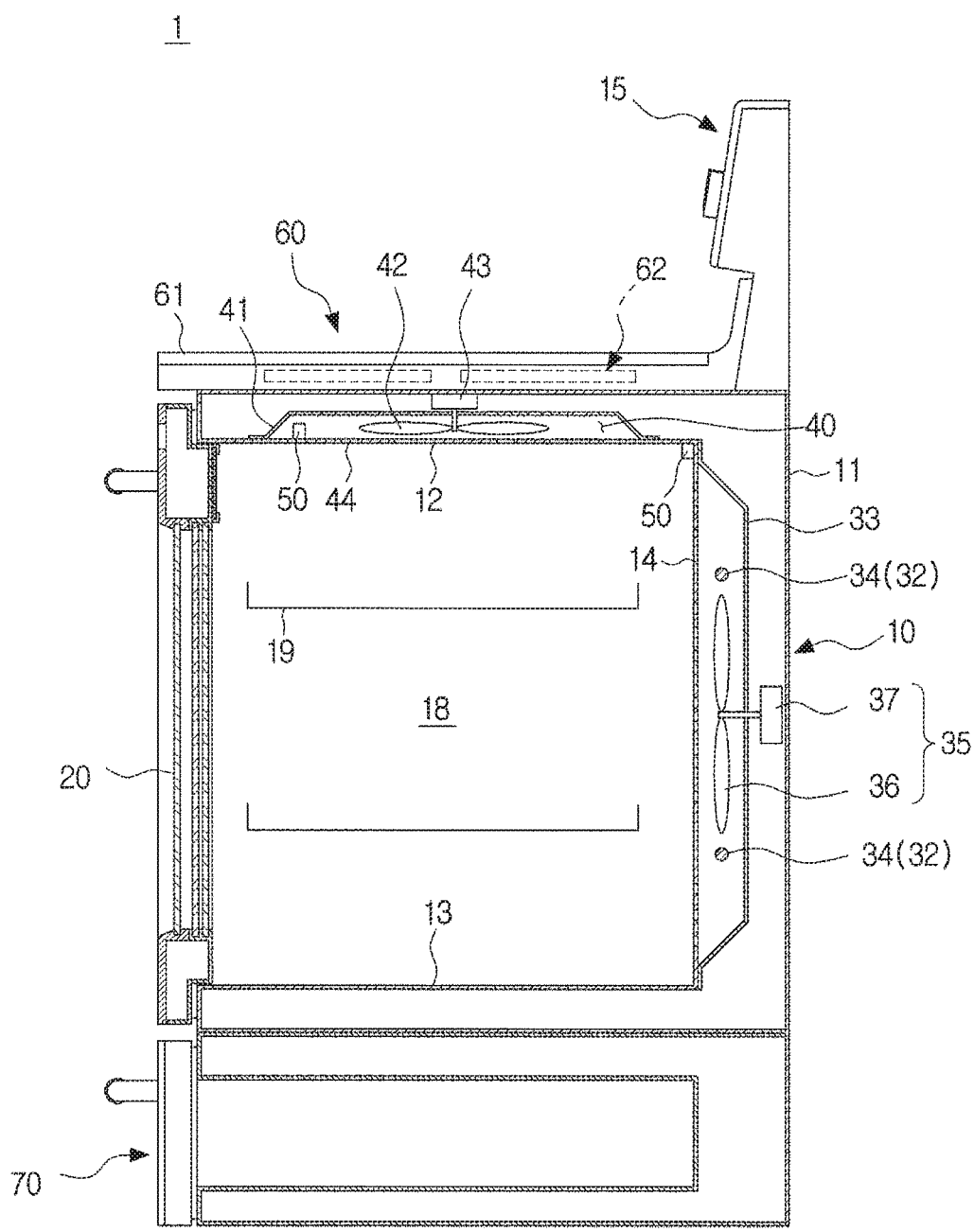
FIG. 16 is a view illustrating an example in which a filter is installed in each of a vent unit and a cooking chamber.

FIG. 15 is a view illustrating an example in which a filter 50 is installed in the cooking chamber 18. FIG. 16 is a view illustrating an example in which a filter 50 is installed in each of the vent unit 40 and the cooking chamber 18.

Referring to FIG. 15, the filter 50 may be installed in the cooking chamber 18. A fixing section (not shown) to fix the filter 50 may be installed in the cooking chamber 18 and the filter 50 may be fixed into the cooking chamber 18 by the fixing section (not shown) installed in the cooking chamber 18. The fixing section (not shown) may have a "C" shape so as to detachably attach the filter 50. A plurality of fixing sections (not shown) may be installed so that the filter 50 may be stably fixed.

The filter 50 may be installed at a higher position than the tray mounting rail (not shown) installed in the cooking chamber 18. This enables combustion gas to be easily discharged. However, the installation position of the filter 50 is not limited thereto.

The filter 50 may be installed such that the introduction section 59 and the discharge section 58 are arranged in parallel with the respective bottom plate 13 and top plate 12. Purified air may be discharged through the discharge section 58 of the filter 50 connected to a separate passage connected to the cooking chamber 18. The filter 50 may also be installed such that the introduction section 59 and the discharge section 58 are arranged in parallel with the respective side plates (not shown). Of course, the filter 50 may also be installed such that the introduction section 59 and the discharge section 58 are arranged in parallel with the respective rear plate 14 and closed door 20.

Referring to FIG. 16, the filter 50 may be installed in each of the cooking chamber 18 and the vent unit 40. Since a case in which the filter 50 is installed in the cooking chamber 18 is identical to that of FIG. 15, the redundant description thereof will be omitted below.

As described above, the vent unit 40 has a structure connected to the cooking chamber 18 through the suction hole 44 formed on the top plate 12. The cooking apparatus 1 may fix the filter 50 by the fixing section (not shown) installed to an upper end of the suction hole 44 such that the introduction section 59 of the filter 50 is directed into the cooking chamber 18.

In addition, a door opening and closing structure may be formed on the top plate 12 such that the filter 50 is detachably attachable to the inside of the cooking chamber 18. Therefore, the user may easily replace the filter 50 in the cooking chamber 18.

The installation positions of the filter 50 according to the embodiment have been described above.

Next, smoke particle removal effects of the filter 50 according to an embodiment will be described.

To experiment the smoke particle removal effects of the filter 50, aerosol particles having different sizes pass through the filter 50 of FIG. 4. Hereinafter, for convenience of description, a ceramic filter is referred to as "a first filter F1" and the filter 50 of FIG. 4 is referred to as "a second filter F2".

TABLE 1

| Particle size (μm) | 4 | 5 | 6 | 7 | 8 | 9 | 10 |
|---|---|---|---|---|---|---|---|
| First filter (F1) | $2.6 \times 10^7$ | $1.9 \times 10^7$ | $1.4 \times 10^7$ | $1.8 \times 10^6$ | $1.8 \times 10^5$ | $4.4 \times 10^4$ | $5.5 \times 10^3$ |
| Second filter (F2) | $2.4 \times 10^7$ | $1.0 \times 10^7$ | $6.0 \times 10^5$ | $2.7 \times 10^5$ | $3.2 \times 10^3$ | 0 | 0 |
| Removal rate (%) | 8.1 | 46 | 96 | 99 | 98 | 100 | 100 |

Table 1 is a result of illustrating particle removal effects of the filter 50 for each size of aerosol particles.

As shown in Table 1, it is identified that the second filter F2 exhibits an improved particle removal rate of 8.1% compared to the first filter F1 with respect to particles having the size of 4 μm. It is identified that the second filter F2 exhibits an improved particle removal rate of 46% compared to the first filter F1 with respect to particles having the size of 5 μm. It is identified that the second filter F2 exhibits an improved particle removal rate of 96 to 100% compared to the first filter F1 with respect to particles having the size of 6 to 10 μm.

As the experiment result, it is identified that the second filter F2 exhibits a high particle removal rate with respect to aerosol particles having a relatively large size. When comparing a removal rate of smoke having carbon as a main ingredient with the experiment result, it is identified that smoke particles having the size of about 6 μm or more among smoke particles contained in combustion gas generated in the pyro-cleaning process may be effectively removed by the filter 50 according to the embodiment.

The cooking apparatus 1 including the filter 50 has been described above. As described above, the relatively large-sized smoke particles generated in the pyro-cleaning process may be effectively removed by the filter 50.

However, combustion gas such as carbon monoxide is also discharged as well as large-sized smoke particles, thereby causing the user inconvenience. Accordingly, to effectively control a discharge amount of combustion gas, a method of controlling a cooking apparatus 1 according to an embodiment will be described below.

Figure 17:
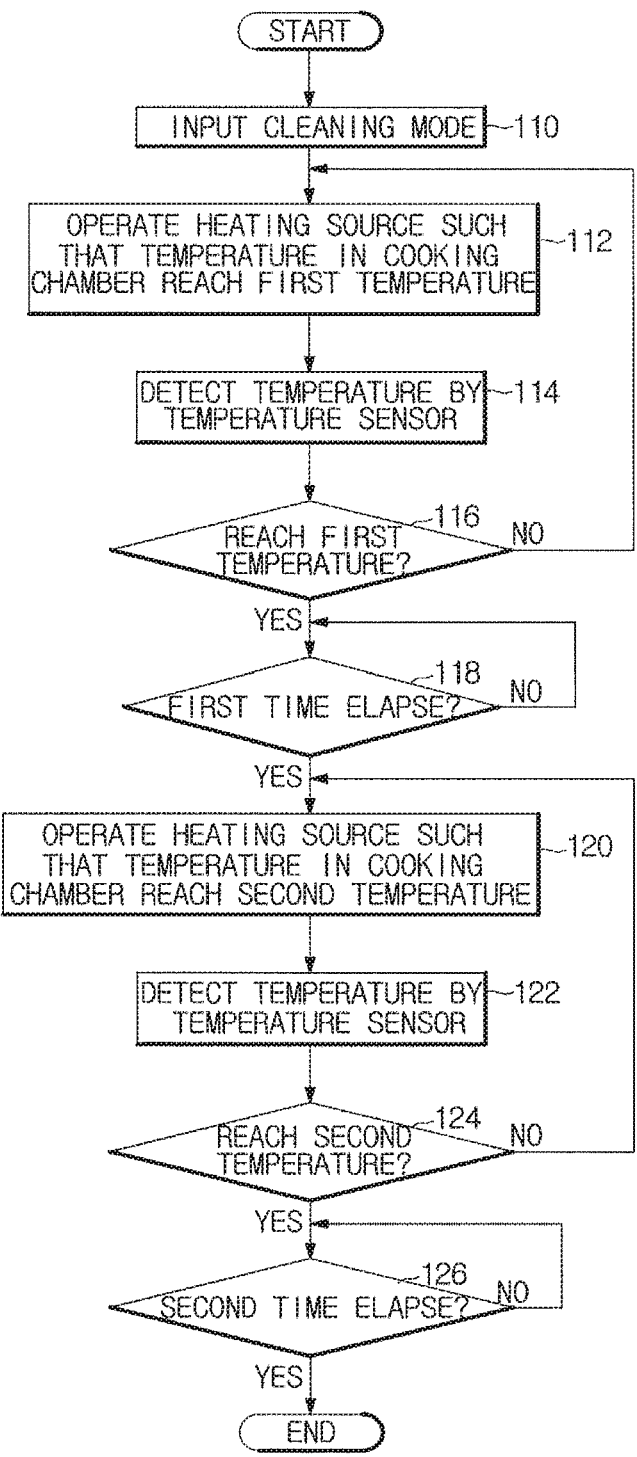
FIG. 17 is a control flowchart illustrating a method of controlling a cooking apparatus according to an embodiment of the present disclosure.
Figure 18:
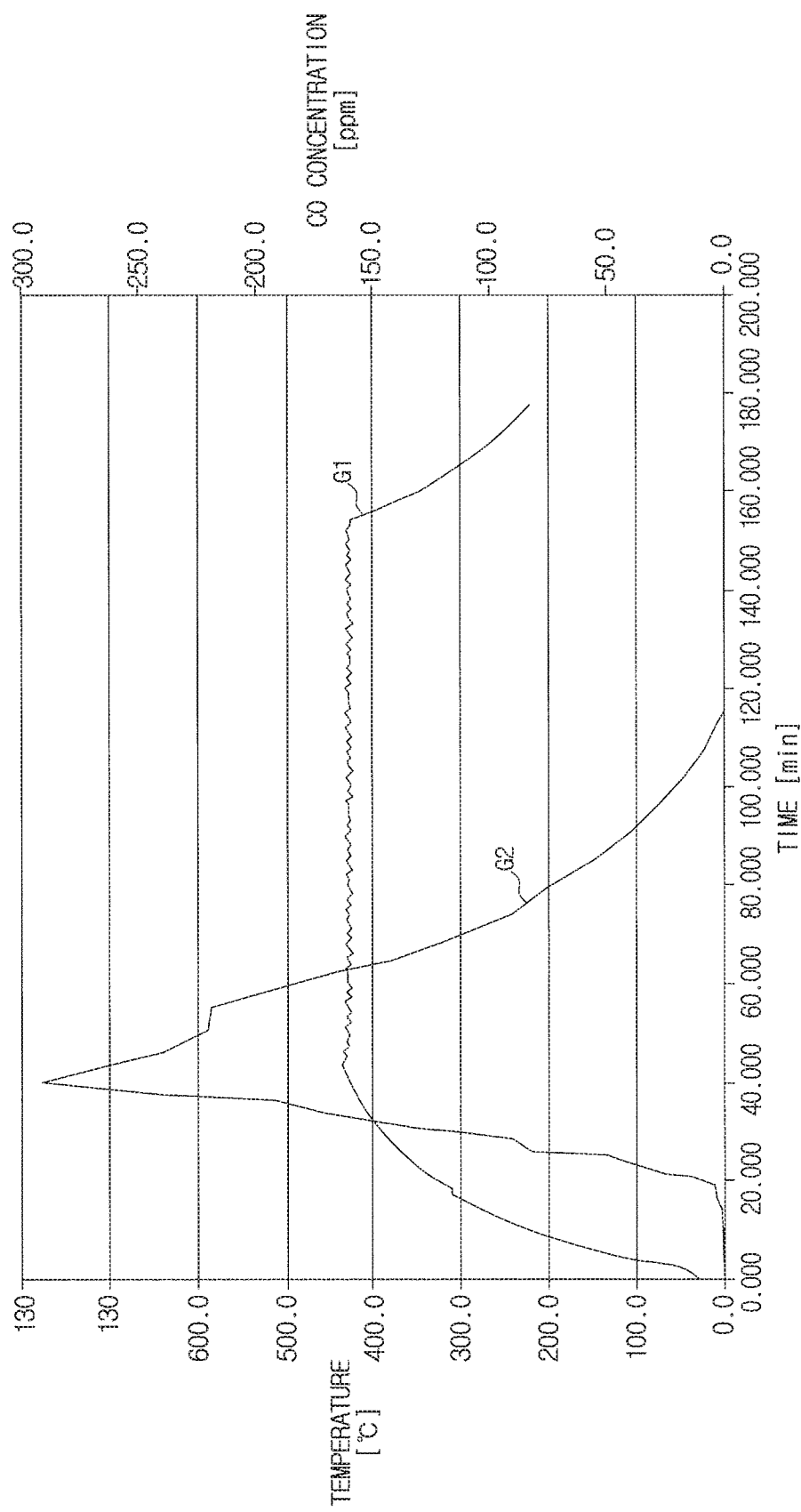
FIG. 18 is a graph illustrating a concentration of combustion gas generated in a cleaning process of a cooking apparatus according to the related art.
Figure 19:
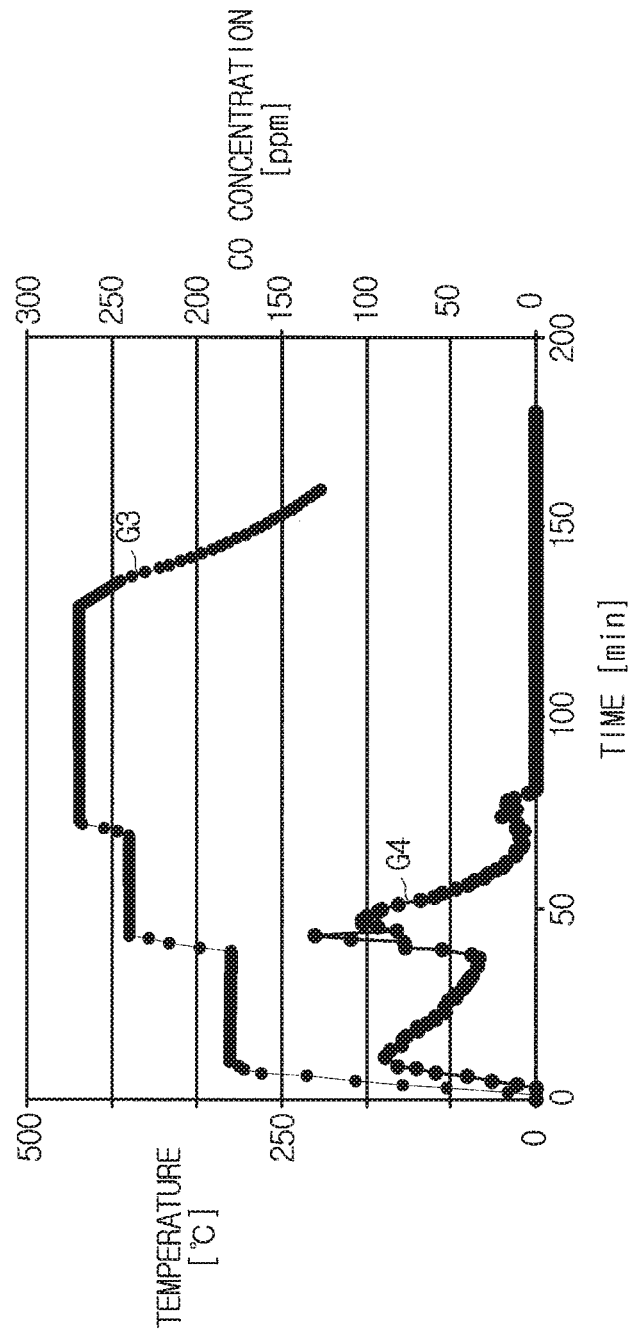
FIG. 19 is a graph illustrating a concentration of combustion gas generated in a cleaning process according to an embodiment of the present disclosure.

FIG. 17 is a control flowchart illustrating a method of controlling a cooking apparatus 1 according to an embodiment. FIG. 18 is a graph illustrating a concentration of combustion gas generated in a cleaning process of a cooking apparatus 1 according to the related art. FIG. 19 is a graph illustrating a concentration of combustion gas generated in a cleaning process according to an embodiment. For convenience of description, FIGS. 18 and 19 show a concentration of carbon monoxide generated in the cleaning process, the carbon monoxide being an example of combustion gas which is mainly generated in the pyro-cleaning process. However, a concentration change of combustion gas including carbon monoxide may be proportional to a discharge amount of smoke particles including carbon particles.

Referring to FIG. 17, an operation signal to select the cleaning mode is first input from the cleaning mode input section (operation 110).

When the operation signal to select the cleaning mode is input, the heating source is operated such that a temperature in the cooking chamber 18 is increased to a preset first temperature (operation 112). In a state in which the heating source is operated and the temperature in the cooking chamber 18 is maintained at the first temperature, contaminants adsorbed on the inner wall of the cooking chamber 18 may be burned.

The first temperature may be a temperature at which contaminants is primarily burned. The first temperature may be set as a temperature equal to or less than about 300° C. and as a temperature within a range of about 250 to 300° C.

When the heating source is operated and the contaminants adsorbed on the inner wall of the cooking chamber 18 begin to be decomposed, the temperature sensor 80 detects a temperature in the cooking chamber 18 (operation 114).

When it is determined that the temperature in the cooking chamber 18 does not reach the first temperature as the result detected by the temperature sensor 80, the heating source continues to be operated such that the temperature in the cooking chamber 18 reaches the first temperature (operations 112 and 116).

When the temperature in the cooking chamber 18 is determined to reach the first temperature as the result detected by the temperature sensor 80, the contaminants in the cooking chamber 18 continue to be decomposed in a state in which the first temperature is maintained for a first time.

Since a decomposition rate of contaminants is increased as the first time becomes longer, the first time may be set as five minutes or more. However, the first time may be properly adjusted in consideration of efficiency in the cleaning process (operations 116 and 118).

The contaminants in the cooking chamber 18 continue to be burned at the first temperature when it is determined that first time does not elapse, and the heating source is operated such the temperature in the cooking chamber 18 is increased to a preset second temperature when the first time is determined to elapse (operations 118 and 120).

The second temperature may be a temperature at which contaminants is secondarily burned and be a higher temperature than the first temperature. The second temperature may be set as a temperature within a range of about 300 to 450° C. and as a temperature within a range of about 430 to 450° C.

When the temperature in the cooking chamber 18 is increased to the second temperature, contaminants, which are not burned at the first temperature, on the inner wall of the cooking chamber 18 may be gradationally burned.

When the contaminants adsorbed on the inner wall of the cooking chamber 18 begin to be secondarily decomposed, the temperature sensor 80 detects a temperature in the cooking chamber 18 (operation 122).

When the temperature in the cooking chamber 18 is determined to reach the second temperature as the result detected by the temperature sensor 80, the contaminants in the cooking chamber 18 are decomposed in a state in which the second temperature is maintained for a second time. The second time may be set as five minutes or more. However, since the decomposition rate of contaminants is increased as the second time becomes longer, the second time may also be set as thirty minutes or more (operations 124 and 126).

When the second time is determined to elapse in a state in which the temperature in the cooking chamber 18 is maintained at the second temperature, the heating source is stopped and the cleaning process of the cooking apparatus 1 is completed.

In FIG. 18, an x-axis refers to a time (min), a left y-axis refers to a temperature (° C.), a right y-axis refers to a concentration (ppm) of carbon monoxide, Graph 1 (G1) refers to a temperature in the cooking chamber 18, and Graph 2 (G2) refers to a concentration of carbon monoxide. In FIG. 19, an x-axis refers to a time (min), a left y-axis refers to a temperature (° C.), a right y-axis refers to a concentration (ppm) of carbon monoxide, Graph 3 (G3) refers to a temperature in the cooking chamber 18, and Graph 4 (G4) refers to a concentration of carbon monoxide.

Referring to FIG. 18, in a cleaning process of a cooking apparatus according to the related art, temperature control to burn contaminants in the cooking chamber 18 is performed in one stage. For this reason, combustion gas such as carbon monoxide generated in a combustion process is also generated at one time, thereby causing the user inconvenience. However, in the cleaning process according to the present embodiment, the temperature is gradationally regulated and thus the amount of carbon monoxide discharged in the cleaning process is gradationally regulated, as shown in FIG. 19. Consequently, comfortableness of the interior may be secured.

The cleaning process of the cooking apparatus 1 in which the combustion temperature is regulated in two stages has been described above. Although the cleaning process of the cooking apparatus 1 in which the combustion temperature is regulated in two stages has been illustratively described in FIGS. 17 and 19, the cleaning process of the cooking apparatus 1 is not limited thereto. That is, in the cleaning process of the cooking apparatus 1, the combustion temperature may also be regulated in three or four stages.

Figure 20:
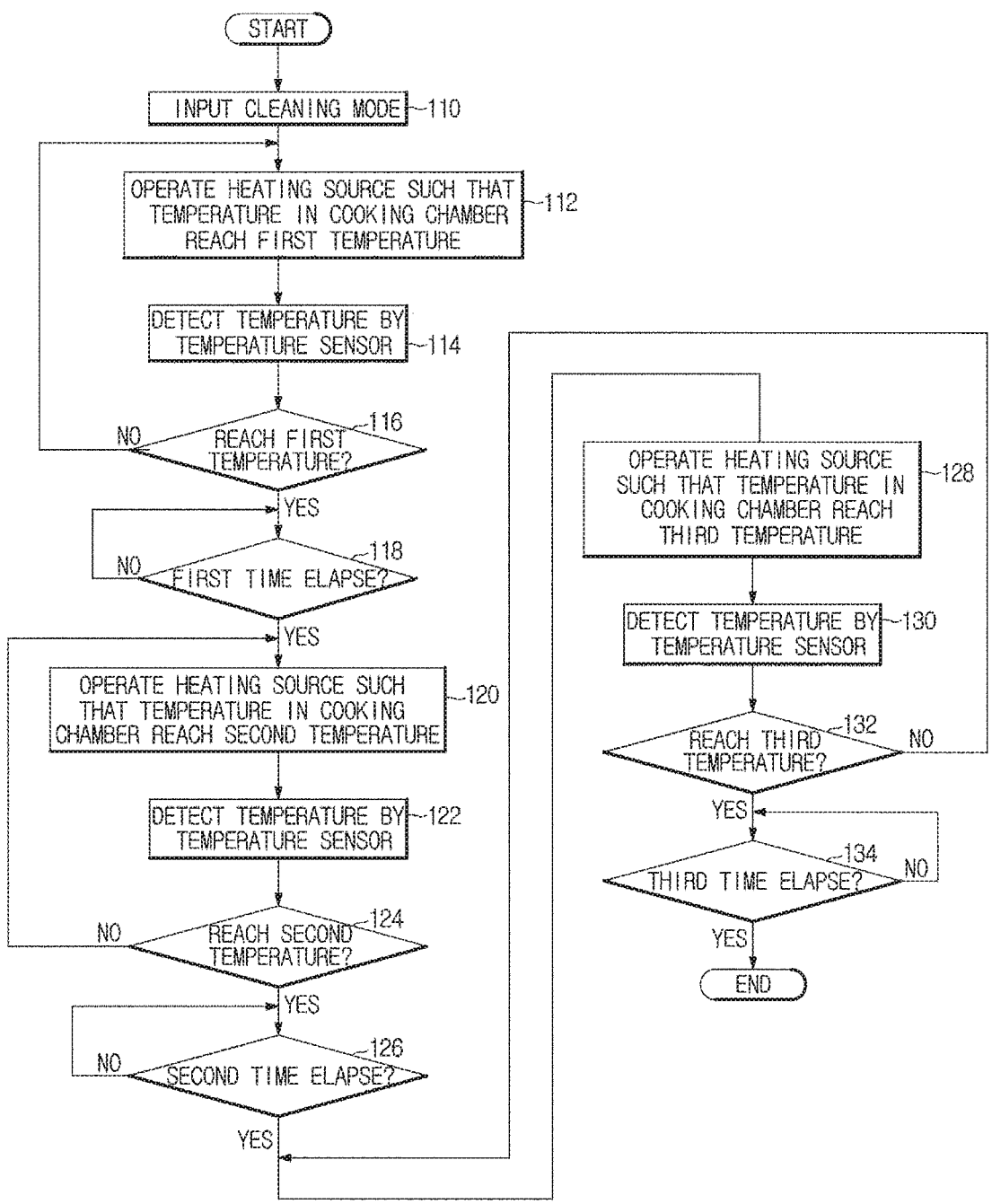
FIG. 20 is a control flowchart illustrating the method of controlling a cooking apparatus in which a combustion temperature is regulated in three stages.
Figure 21:
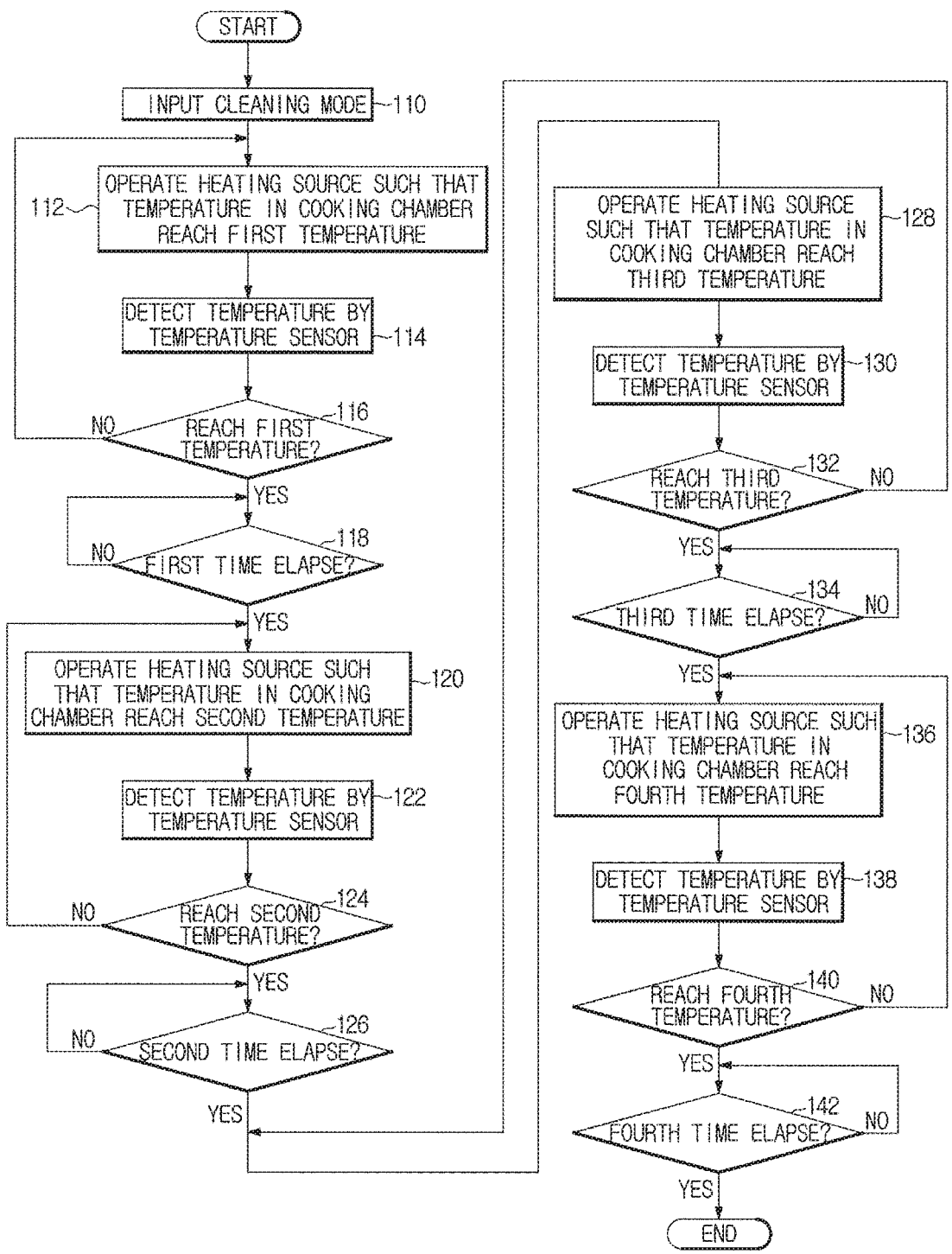
FIG. 21 is a control flowchart illustrating the method of controlling a cooking apparatus in which a combustion temperature is regulated in four stages.

FIG. 20 is a control flowchart illustrating the method of controlling the cooking apparatus 1 in which the combustion temperature is regulated in three stages. FIG. 21 is a control flowchart illustrating the method of controlling the cooking apparatus 1 in which the combustion temperature is regulated in four stages.

Referring to FIG. 20, in a case in which the combustion temperature is regulated in three stages, a control process of the cooking apparatus 1 may further include a final operation in which the temperature in the cooking chamber 18 is maintained at a preset third temperature higher than the second temperature for a preset third time, in addition to the control process shown in FIGS. 17 and 19.

In more detail, operations 110 to 126 may be substantially identical to those shown in FIG. 17. However, the first temperature may be set within a range of 250 to 300° C. and the first time may be set as five minutes or more. In addition, the second temperature may be set within a range of 300 to 430° C. and the second time may be set as five minutes or more.

When the second time is determined to elapse, the heating source is operated such that the temperature in the cooking chamber 18 is increased to a preset third temperature. The third temperature may be a temperature at which contaminants is thirdly burned and be a higher temperature than the second temperature. The third temperature may be set within a range of about 430 to 450° C. (operation 128).

When the temperature in the cooking chamber 18 is increased to the third temperature, contaminants, which are not burned at the first and second temperatures, on the inner wall of the cooking chamber 18 may be gradationally burned.

When the contaminants adsorbed on the inner wall of the cooking chamber 18 begin to be thirdly decomposed, the temperature sensor 80 detects a temperature in the cooking chamber 18 (operation 130).

When the temperature in the cooking chamber 18 is determined to reach the third temperature as the result detected by the temperature sensor 80, the contaminants in the cooking chamber 18 are decomposed in a state in which the third temperature is maintained for a third time. The third time may be set as five minutes or more. However, since the decomposition rate of contaminants is increased as the third time becomes longer, the third time may also be set as thirty minutes or more (operations 132 and 134).

When the third time is determined to elapse in a state in which the temperature in the cooking chamber 18 is maintained at the third temperature, the heating source is stopped and the cleaning process of the cooking apparatus 1 is completed.

Referring to FIG. 21, in a case in which the combustion temperature is regulated in four stages, a control process of the cooking apparatus 1 may further include a final operation in which the temperature in the cooking chamber 18 is maintained at a preset fourth temperature higher than the third temperature for a preset fourth time, in addition to the control process shown in FIG. 20.

In more detail, operations 110 to 134 may be substantially identical to those shown in FIG. 20. However, the first temperature may be set within a range of 250 to 300° C. and the first time may be set as five minutes or more. In addition, the second temperature may be set within a range of about 300 to 350° C. and the second time may be set as five minutes or more. Furthermore, the third temperature may be set within a range of about 350 to 420° C. and the third time may be set as five minutes or more.

When the third time is determined to elapse, the heating source is operated such that the temperature in the cooking chamber 18 is increased to a preset fourth temperature. The fourth temperature may be a temperature at which contaminants is fourthly burned and be a higher temperature than the third temperature. The fourth temperature may be set within a range of about 430 to 450° C. (operation 136).

When the temperature in the cooking chamber 18 is increased to the fourth temperature, contaminants, which are not burned at the first to third temperatures, on the inner wall of the cooking chamber 18 may be gradationally burned.

When the contaminants adsorbed on the inner wall of the cooking chamber 18 begin to be fourthly decomposed, the temperature sensor 80 detects a temperature in the cooking chamber 18 (operation 138).

When the temperature in the cooking chamber 18 is determined to reach the fourth temperature as the result detected by the temperature sensor 80, the contaminants in the cooking chamber 18 are decomposed in a state in which the fourth temperature is maintained for a fourth time. The fourth time may be set as five minutes or more. However, since the decomposition rate of contaminants is increased as the fourth time becomes longer, the fourth time may also be set as thirty minutes or more (operations 140 and 142).

When the fourth time is determined to elapse in a state in which the temperature in the cooking chamber 18 is maintained at the fourth temperature, the heating source is stopped and the cleaning process of the cooking apparatus 1 is completed.

Figure 22:
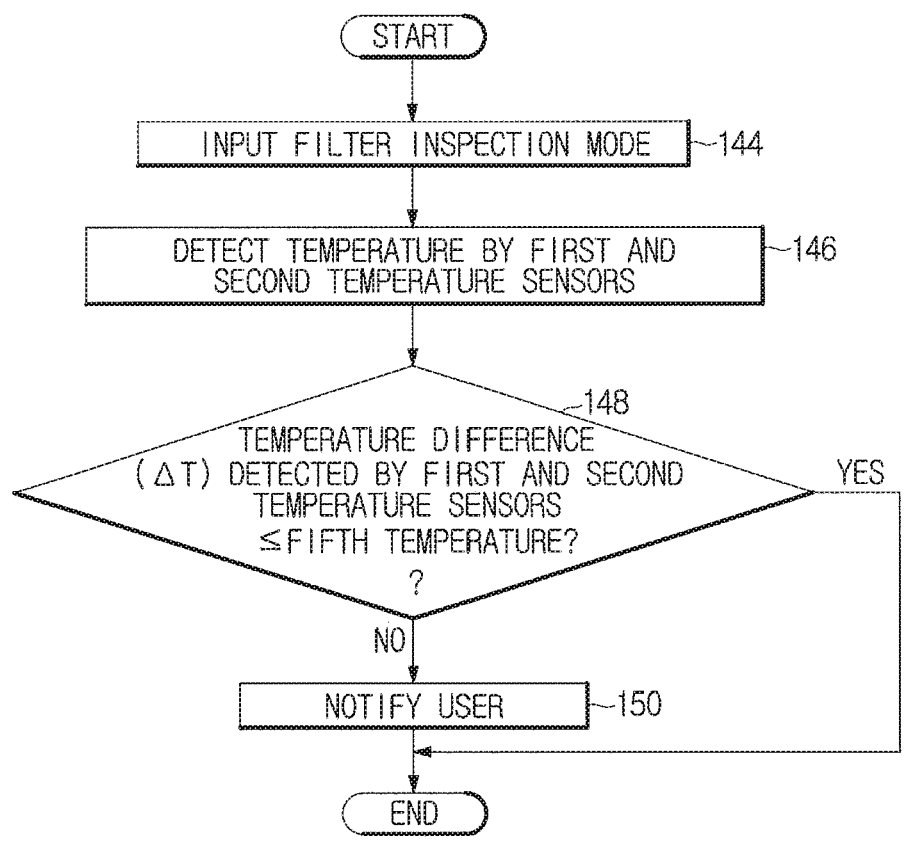
FIG. 22 is a control flowchart illustrating a process of detecting an operation state of a filter of the cooking apparatus, a temperature sensor being installed in the filter.

Next, a method of controlling the cooking apparatus 1 including the filter 50e in which the temperature sensor 81 is installed will be described. FIG. 22 is a control flowchart illustrating a process of detecting an operation state of the filter 50e of the cooking apparatus 1, and the temperature sensor 81 is installed in the filter 50e.

Referring to FIG. 22, an operation signal to select the filter inspection mode is first input from the filter inspection mode input section (operation 144). Although FIG. 22 illustratively shows that the filter inspection mode is performed when the command to execute the filter inspection mode is input by the user, determination of whether or not the filter 50e is blocked is not limited thereto. Of course, the determination may be automatically performed based on the program which is previously stored.

When the filter inspection mode is performed, the first and second temperature sensors 80 and 81 detect a temperature in the cooking chamber 18 and a temperature in the discharge section 58, respectively (operation 146).

When a temperature difference detected by the first and second temperature sensors 80 and 81 is equal to or less than a preset fifth temperature, the filter 50 is determined to normally operate and the filter inspection mode is completed (operation 148).

When the temperature difference detected by the first and second temperature sensors 80 and 81 is greater than the preset fifth temperature, it is determined that the filter 50 does not normally operate, an alarm is output to the user by the alarm system 90, and the filter inspection mode is completed (operation 150).

The cooking apparatus 1 including the filter 50 and the method of controlling the same have been described above. Next, a cooking apparatus 1 including a metal foam MF and a method of controlling the same will be described.

Figure 23:
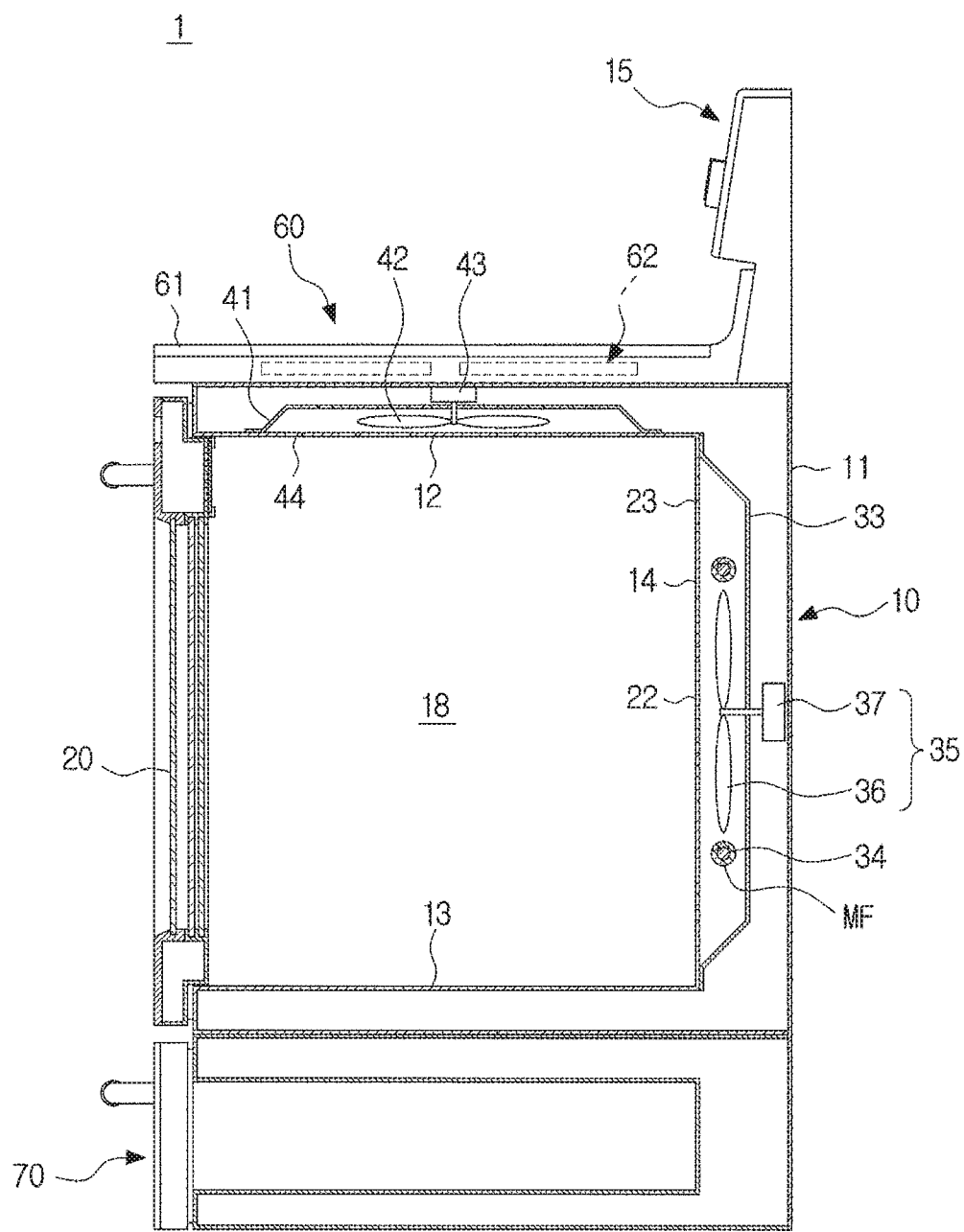
FIG. 23 is a view illustrating a configuration of a cooking apparatus including metal foams.

FIG. 23 is a view illustrating a configuration of a cooking apparatus 1 including metal foams MF.

As shown in FIG. 23, the cooking apparatus 1 may include an oven 10 configured to heat and cook food in a state in which the food is sealed, a cooktop 60 arranged above the oven 10 such that cooking containers may be placed on the cooktop so as to cook food, and a drawer 70 arranged beneath the oven 10 so as to serve as a storage function or a simple cooking function. Since the cooktop 60 and the drawer 70 are substantially identical to those of FIG. 1, the redundant description will be omitted below.

The oven 10 is installed beneath of the cooktop 60 to cook food using heat convection.

The oven 10 may include a main body 11 having a cooking chamber 18 formed therein, a heating source to heat air in the cooking chamber 18 of the main body 11, and metal foams MF which are installed around the heating source and collect and decompose cooking gas generated in a cooking process.

A control panel 15 to control an operation of the oven 10 may be arranged above the main body 11 of the oven 10. Operation commands of the oven 10 may be input to the control panel 15 by a user and the control panel 15 may display operation information of the oven 10 for the user. The control panel 15 may include an input unit 16 to which the operation commands are input by the user and a display unit 17 configured to display the operation information of the oven 10. In more detail, the input unit 16 may include an operation mode input section to which operation commands of the oven 10 are input, and a deodorization mode input section to which the user's commands related to a deodorization operation in the oven 10 are input. The display unit 17 may include an operation information display section configured to display operation information related to an operation of the oven 10, and a deodorization information display section configured to display operation information related to the deodorization operation in the oven 10. Hereinafter, for convenience of description, the redundant description of the input unit 16 and display unit 17 of the control panel 15 identical to those of FIGS. 1 and 2 will be omitted.

An external appearance of the main body 11 of the oven 10 is defined by a top plate 12, a bottom plate 13, both side plates (not shown), and a rear plate 14, and the cooking chamber 18 may be formed in the main body 11. In addition, a door 20 to open and close an opened front of the cooking chamber 18 may be disposed on a front surface of the main body 11.

A fan cover 41 may be coupled outside the top plate 12 and be provided with an exhaust fan 42 which generates airflow to discharge air in the cooking chamber 18. A second fan motor 43 to drive the exhaust fan 42 may be installed to the rear of the exhaust fan 42.

The top plate 12 facing the exhaust fan 42 may be formed with a plurality of suction holes 44 through which air in the cooking chamber 18 may be introduced. The air introduced through the suction holes 44 may be mixed with outside cold air to be discharged to the outside.

A plurality of suction holes 22 is formed in the vicinity of a center of the rear plate 14 such that air in the cooking chamber 18 may be introduced therethrough. A plurality of discharge holes 23 is formed at an edge of the rear plate 14 such that hot air may be supplied into the cooking chamber 18.

A fan cover 33 may be coupled outside the rear plate 14 and a convection flow unit including heaters 34 and a convection fan 36 may be formed in a space defined between the fan cover 33 and the rear plate 14. In addition, a first fan motor 37 to drive the convection fan 36 may be installed to the rear of the fan cover 33.

At least one metal foam MF may be installed around the convection flow unit. In more detail, the heaters 34 may be installed at the outer periphery of the convection fan 36 provided at the rear surface of the fan cover 33 and the cylindrical metal foam MF may be installed on a surface of each heater 34. The metal foam MF will be described more detail later.

The heater 34 heats air which is introduced through the suction holes 22 and is discharged into the cooking chamber 18 through the discharge holes 23. In more detail, the heater 34 may be installed on a passage of air, which is introduced through the suction holes 22 and is discharged through the discharge holes 23, to heat the air circulated in the convection flow unit.

Although not shown in FIG. 23, the cooking apparatus 1 according to an embodiment may further include a heating source besides the heater 34 of FIG. 23 so as to cook a cooking object. For example, the top plate 12 or bottom plate 13 of the cooking chamber 18 may be additionally provided with an auxiliary heater and the like to heat the cooking object accommodated in the cooking chamber 18.

Hereinafter, the metal foam MF will be described more detail.

The metal foam MF collects and decomposes cooking gas contained in air within the cooking chamber 18.

Figure 24:
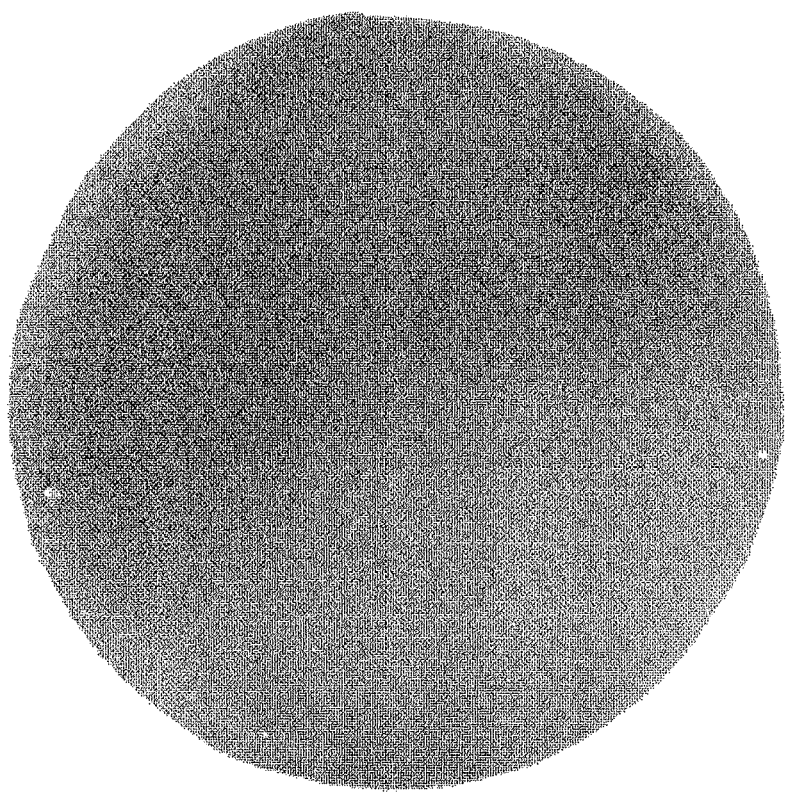
FIG. 24 is an enlarged view illustrating a surface of one metal foam.
Figure 25:
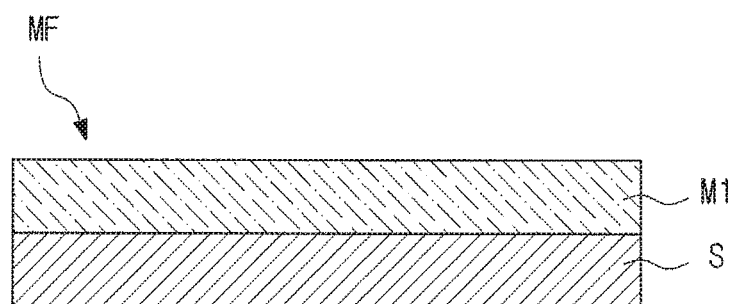
FIGS. 25 and 26 are enlarged views illustrating a structure of the metal foam.
Figure 26:
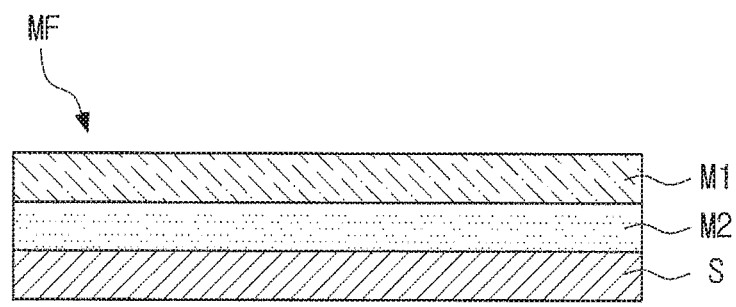

FIG. 24 is an enlarged view illustrating a surface of the metal foam MF. FIGS. 25 and 26 are enlarged views illustrating a structure of the metal foam MF.

Referring to FIG. 24, the metal foam MF is formed in a porous structure having a plurality of bubbles therein. The metal foam MF may have a large surface area by the porous structure, and thus may increase a contact area with contaminants such as gas and oil mist generated during cooking.

In addition, the bubbles may have different sizes within a range of 10 to 3000 micrometers.

In addition, the metal foam MF may have heat resistance so as not to be corroded due to heat radiated by the heater 34. In more detail, the metal foam MF may have a catalyst activated at a high temperature within a range of 100 to 1000° C.

Referring to FIG. 25, the metal foam MF may include a metal member S made of at least one metal element selected from the group consisting of nickel (Ni), chrome (Cr), and iron (Fe), and a metal catalyst layer M1 which is made of at least one platinum metal element selected from the group consisting of platinum (Pt), rubidium (Rd), and rhodium (Rh) and is formed on a surface of the metal member S.

The metal member S forms the structure of the metal foam MF. That is, the metal foam MF may have a porous structure by the metal member S. The metal foam MF may further include a mounting structure so as to be mounted around the main body 11, heater 34, or convection fan 36 of the cooking apparatus 1. In this case, the main body 11, heater 34, or convection fan 36 of the cooking apparatus 1 may be provided with a support member to mount the mounting structure.

The platinum metal element may be applied to the surface of the metal member S to function as a catalyst under a high-temperature condition. In more detail, the platinum metal element may allow contaminants such as gas and oil mist collected on the bubbles of the metal foam MF to be better decomposed even under high-temperature conditions of 100 to 1000° C.

The platinum metal element functioning as a catalyst may be formed on the surface of the metal member S by at least one of a dipping method, a plating method, a sputtering method, and a spray method.

Referring to FIG. 26, the metal foam MF may further include a metal oxide layer M2 which is formed between the metal member S and the metal catalyst layer M1 and is made of at least one metal oxide selected from the group consisting of aluminum oxide ($Al_2O_3$), magnesium oxide (MgO), and copper oxide (CuO).

The metal oxide layer M2 may be selectively provided in order to apply the metal catalyst layer M1 to the surface of the metal member S. In more detail, in a case in which the metal catalyst layer M1 is applied to the metal member S by the dipping method or the spray method, after the metal oxide layer M2 serving as a carrier is applied to the metal member, the metal catalyst layer M1 may be formed on the metal oxide layer. In a case in which the metal catalyst layer M1 is applied to the metal member S by the plating method or the sputtering method, the metal oxide layer M2 may be selectively included in the metal foam.

Although not shown in FIGS. 25 and 26, the metal oxide layer may also be solely formed on the surface of the metal member.

Figure 27:
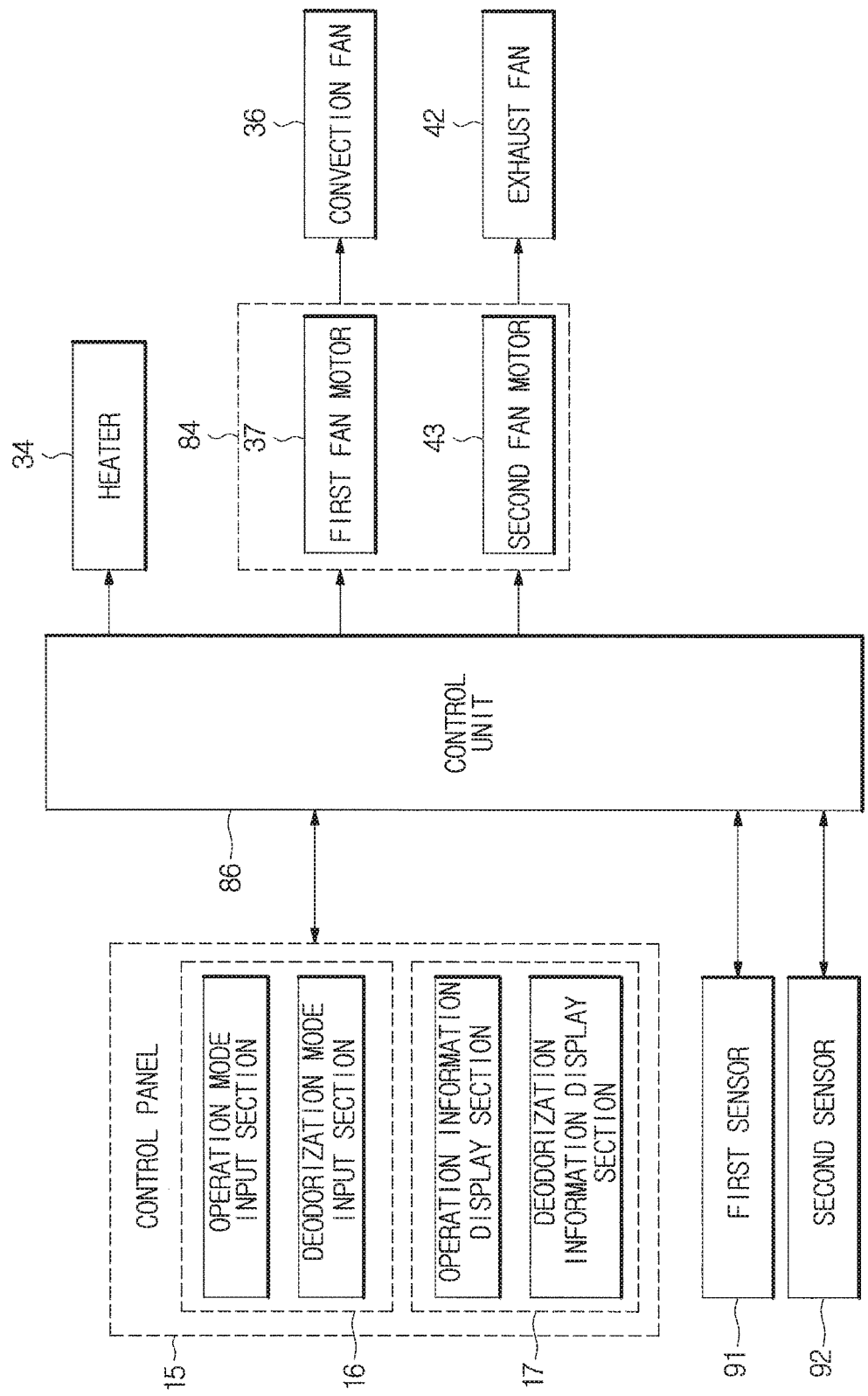
FIG. 27 is a control block diagram illustrating the cooking apparatus of FIG. 23.

FIG. 27 is a control block diagram illustrating the cooking apparatus 1 according to an embodiment.

Referring to FIG. 27, the cooking apparatus 1 according to the embodiment may include a control panel 15, a heater 34, a convection fan 36, an exhaust fan 42, a first sensor 91, a second sensor 92, a drive unit 84, and a control unit 86. The first and second sensors 91 and 92 may be selectively included in the cooking apparatus 1 if necessary.

As described above, a variety of commands for the operation of the cooking apparatus 1 are input to the input unit 16 of the control panel 15 by the user and the display unit 17 displays a variety of operation information for the user. For example, the input unit 16 may include an operation mode input section and a deodorization mode input section, and the display unit 17 may include an operation information display section and a deodorization information display section.

The first sensor 91 detects contaminants contained in cooking gas. The cooking gas may contain water vapor, combustion oxide, oil mist, etc., and the first sensor 91 may detect concentrations thereof to detect the contaminants contained in the cooking gas.

The second sensor 92 detects whether or not a cooking object is accommodated in the cooking chamber 18. The second sensor 92 may be a temperature sensor, an optical sensor, or the like.

Meanwhile, although not shown in FIG. 27, when the cleaning mode of FIG. 17 is applied to the cooking apparatus 1 according to the embodiment, the temperature sensor 80 may also be adopted in order to detect the temperature in the cooking chamber 18.

Information detected by the first and second sensors 91 and 92 is transferred to the control unit 86 and the control unit 86 controls a point of time for execution of a deodorization mode based on data collected from the first and second sensors 91 and 92.

The drive unit 84 outputs driving signals to each component of the cooking apparatus 1. The drive unit 84 may include the first fan motor 37 to drive the convection fan 36 and the second fan motor 43 to drive the exhaust fan 42.

The control unit 86 controls an overall operation of the cooking apparatus 1 and a signal flow between internal components of the cooking apparatus 1, and processes data. The control unit 86 may execute an OS (Operation System) and various applications stored in the storage unit 82 when input of the user or a preset condition is satisfied.

When the operation mode of the cooking apparatus 1 is input by the user, the control unit 86 may control the heater 34, the convection fan 36, and the like such that food accommodated in the cooking chamber 18 is cooked. In addition, when the deodorization mode of the cooking apparatus 1 is input by the user, the control unit 86 may control the heater 34, the convection fan 36, and the like such that the deodorization mode is performed.

Due to heating characteristics of the cooking apparatus 1, cooking gas such as water vapor and combustion oxide may be generated in the cooking chamber 18. A portion of the cooking gas is introduced into the interior to thereby cause odors in the interior. Accordingly, when air in the cooking chamber 18 of the oven 10 is contaminated due to repeated operations of the cooking apparatus 1, a process of decomposing the contaminated air in the cooking chamber 18 and eliminating odors should be performed.

When air in the cooking chamber 18 is contaminated, the cooking apparatus 1 according to the embodiment operates and controls the deodorization mode such that odors of the cooking gas generated during cooking are effectively eliminated. The cooking apparatus 1 adjusts the cleaning mode such that combustion gas is gradationally discharged during cleaning, with the consequence that the combustion gas is effectively decomposed through the metal foam MF. Since the cleaning process of the cooking apparatus 1 according to the embodiment is identical to that of FIG. 17, the redundant description thereof will be omitted.

Hereinafter, a deodorization mode control process of the cooking apparatus 1 according to an embodiment will be described.

Figure 28:
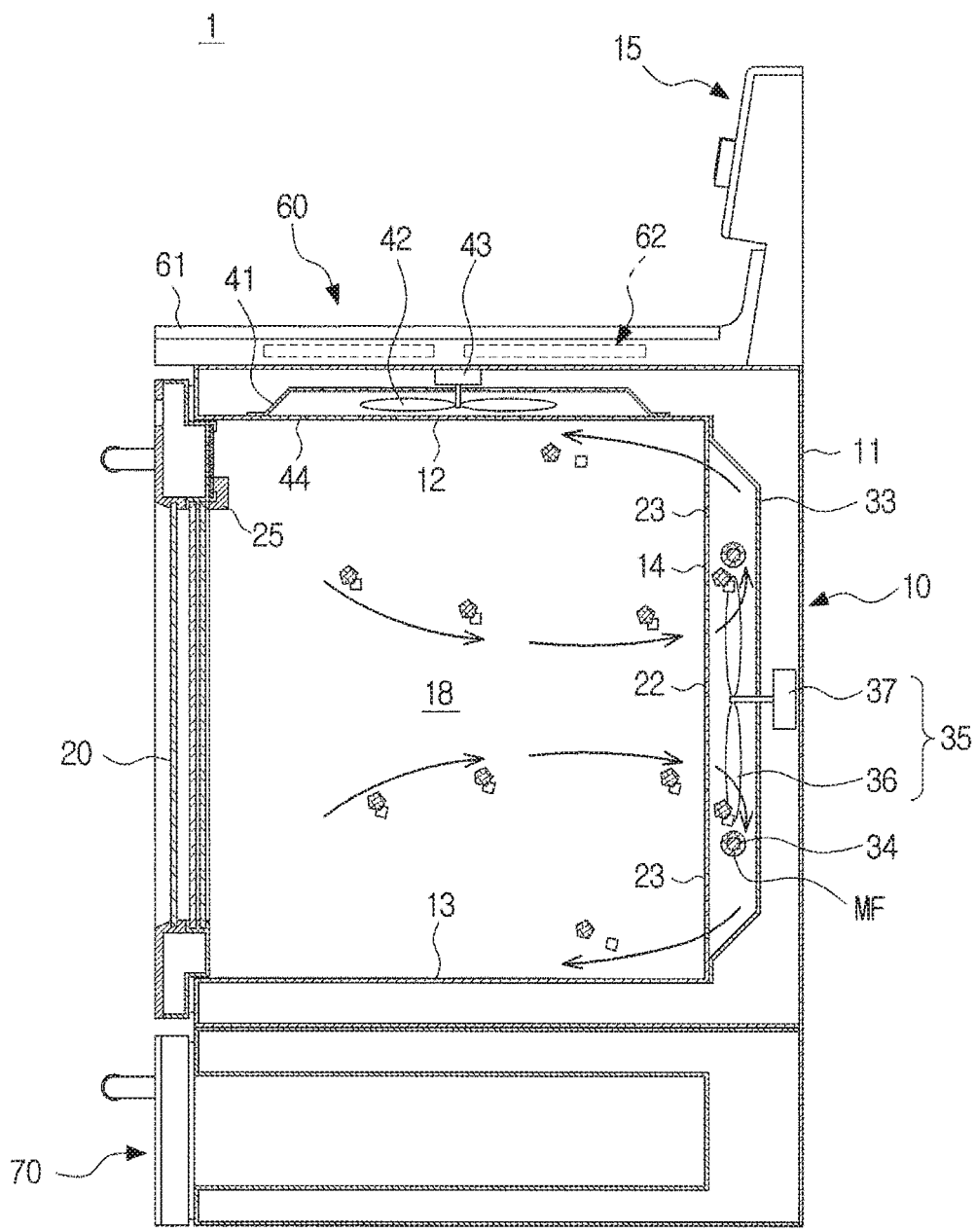
FIG. 28 is a view illustrating a control process of the cooking apparatus of FIG. 23.

FIG. 28 is a view illustrating a control process of the cooking apparatus 1 according to an embodiment.

When the user operates the deodorization mode through the input unit 16 of the control panel 15 of the cooking apparatus 1, a contamination level in the cooking chamber 18 is determined and the heater 34 and the convection fan 36 are controlled such that the deodorization mode is performed. In more detail, when the first sensor 91 detects contaminants in the cooking chamber 18 and the contamination level in the cooking chamber 18 is determined to be equal to or greater than a preset level as the result detected by the first sensor 91, the heater 34 and the convection fan 36 are controlled such that the deodorization mode is performed. In this case, a gas sensor may be used as the first sensor 91.

Referring to FIG. 28, when the operation of the deodorization mode begins, cooking gas in the cooking chamber 18 is introduced into the convection flow unit through the suction holes 22 while the convection fan 36 rotates by the first fan motor 37 and the introduced cooking gas is heated by the heater 34 formed at the outer periphery of the convection fan 36. The air heated by the heater 34 is collected in the metal foam MF while coming into contact with the metal foam MF mounted around the surface of the heater 34 and is decomposed in real time by the high-temperature catalyst applied to the surface of the metal foam MF.

Since temperatures exhibiting optimal activation of the catalyst differ according to the types thereof, a heating temperature by the heater 34 may be regulated according to the types of high-temperature catalyst included in the metal foam MF. In addition, the catalyst has properties of accelerating a reaction while the catalyst itself is not changed during the reaction. Accordingly, the metal foam MF according to an embodiment includes a platinum catalyst on the surface thereof and semi-permanently decomposes contaminants.

Meanwhile, when the cooking apparatus 1 includes the second sensor 92, whether or not the cooking object is accommodated in the cooking chamber 18 may be detected before the contamination level is determined and then the deodorization mode is performed.

When the cooking object is accommodated in the cooking chamber 18 as the result detected by the second sensor 92, the operations of the heater 34 and the convection fan 36 may be controlled such that the deodorization mode is not performed.

In addition, the cooking apparatus 1 may further include a door locking device 25. When the deodorization mode is performed by the control unit 86, the door 20 of the cooking apparatus 1 may be closed using the door locking device 25.

Figure 29:
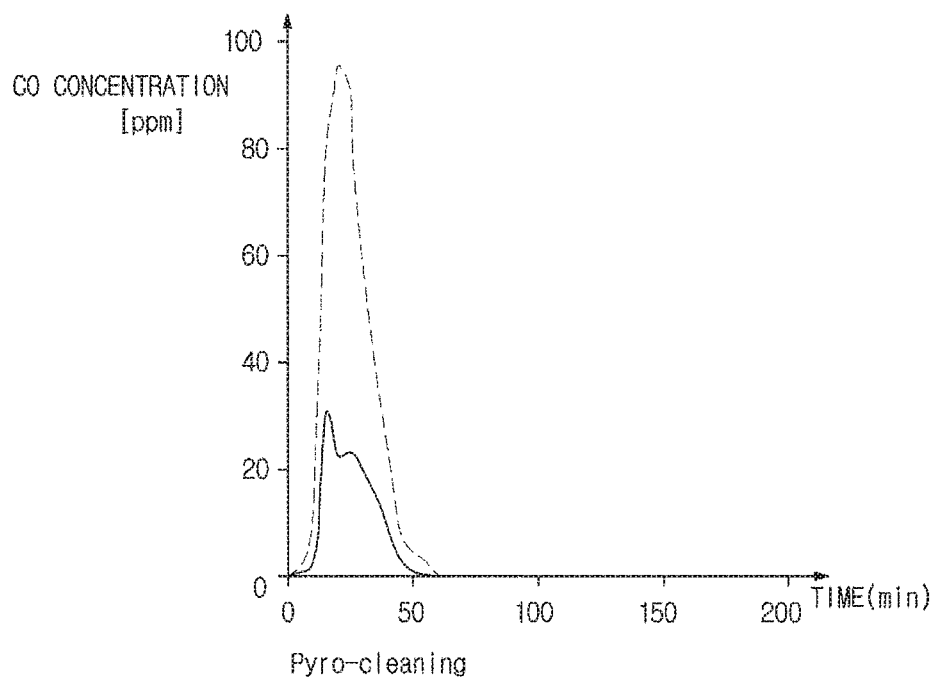
FIG. 29 is a view illustrating a contamination reduction effect according to the cooking apparatus of FIG. 23.
Figure 29:
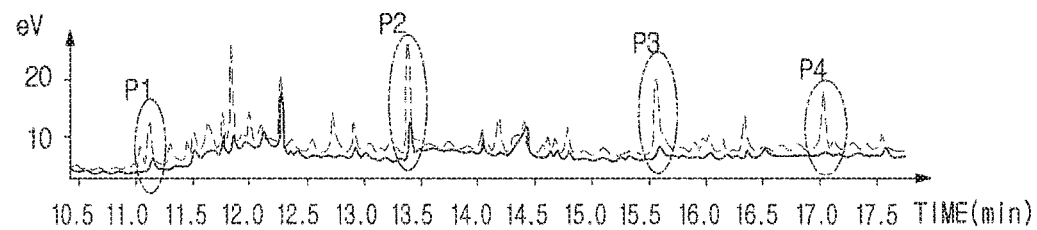

FIG. 29 is a view illustrating a contamination reduction effect according to the cooking apparatus 1 according to an embodiment. FIG. 29(a) is a view illustrating a concentration change of carbon monoxide according to the time in the pyro-cleaning process, and FIG. 29(b) is a view illustrating a decomposition effect of cooking gas which is a cause of smell when a mackerel is cooked by the cooking apparatus 1 according to the embodiment.

In FIG. 29(a), a horizontal axis refers to a time and a vertical axis refers to a concentration of carbon monoxide. The carbon monoxide is a toxic gas generated by imperfect combustion of a cooking object in the cooking process. Referring to FIG. 29, it may be identified that more than half of the amount of carbon monoxide measured as a surface area is reduced by the cooking apparatus 1 according to the embodiment, compared to the cooking apparatus 1 according to the related art in which the metal foam MF is not mounted.

In FIG. 29(b), a horizontal axis refers to a type of cooking gas generated according to the time when a mackerel is cooked by the cooking apparatus 1 and a vertical axis refers to conversion of an amount of cooking gas generated according to the cooking time into an electric signal. In addition, four peaks mean benzaldehyde (P1), nonanal (P2), 2-Decanal,(E)- (P3), and 2-Undecanal (P4), respectively.

Referring to FIG. 29(b), it may be identified that the peak magnitude of benzaldehyde is reduced by 99%, the peak magnitude of nonanal is reduced by 75.4%, the peak magnitude of 2-Decanal,(E)- is reduced by 99%, and the peak magnitude of 2-Undecanal is reduced by 99% in the cooking apparatus 1 according to the embodiment, compared to the cooking apparatus 1 according to the related art in which the metal foam MF is not mounted. That is, it may be identified that substances which is a cause of smell when a mackerel is cooked is adsorbed on and decomposed by the metal foam MF.

Next, various application examples of the metal foam MF in the cooking apparatus 1 according to an embodiment will be described.

Figure 30:
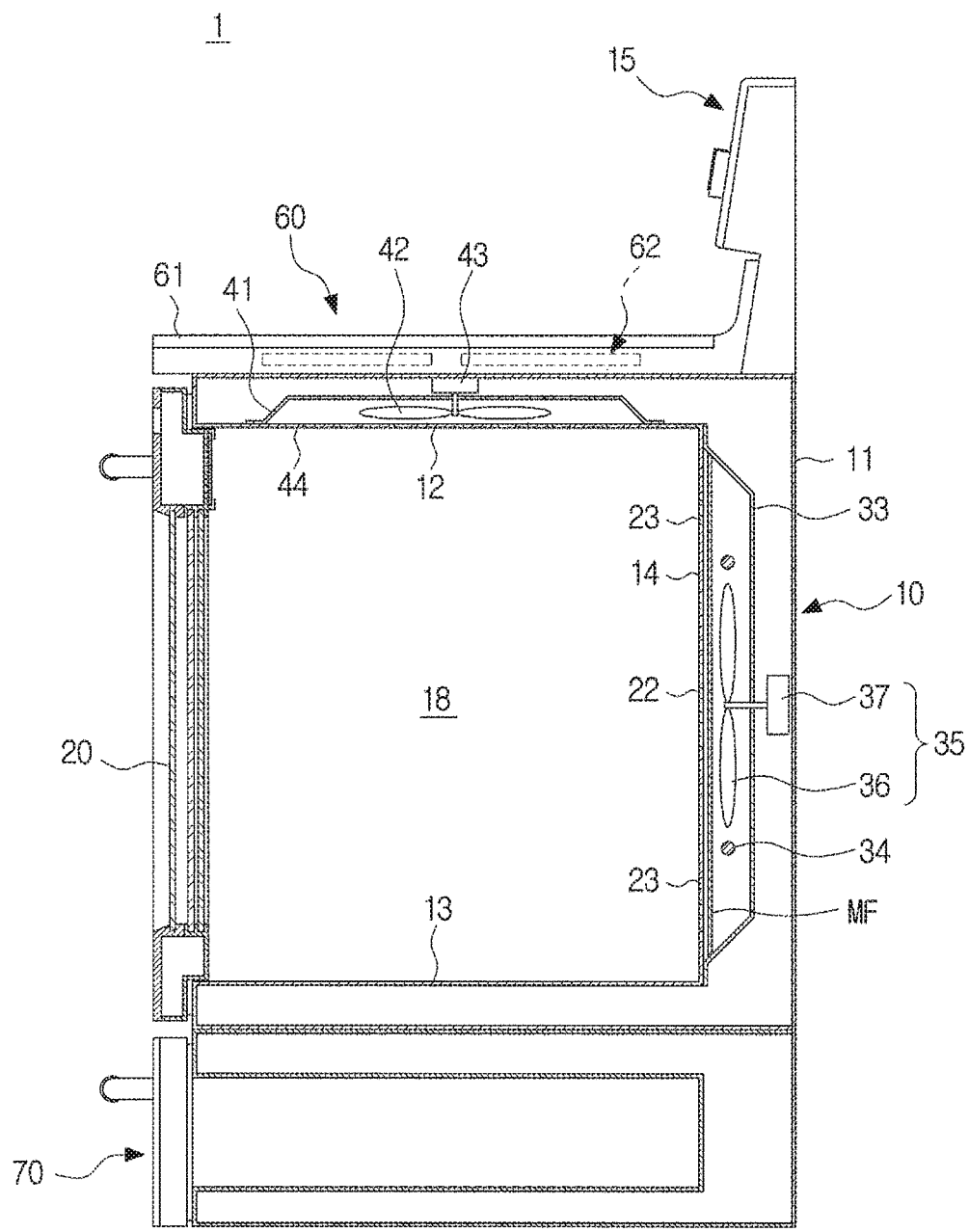
FIG. 30 is a view illustrating a configuration of a cooking apparatus in which a metal foam is mounted between a heater and a rear plate of a main body.

FIG. 30 is a view illustrating a configuration of a cooking apparatus 1 in which a metal foam MF is mounted between a heater 34 and a rear plate 14 of a main body 11.

Referring to FIG. 30, in the cooking apparatus 1, the metal foam MF is located between the heater 34 and the rear plate 14 of the main body 11 unlike the metal foam of FIG. 24. When the metal foam MF is mounted in an array manner as in FIG. 30, it may be possible to prevent direct contact between the metal foam MF and the cooking object. In addition, it may be possible to prevent the metal foam MF from being damaged due to direct contact with the heater 34 and to enhance heat transfer efficiency.

Figure 31:
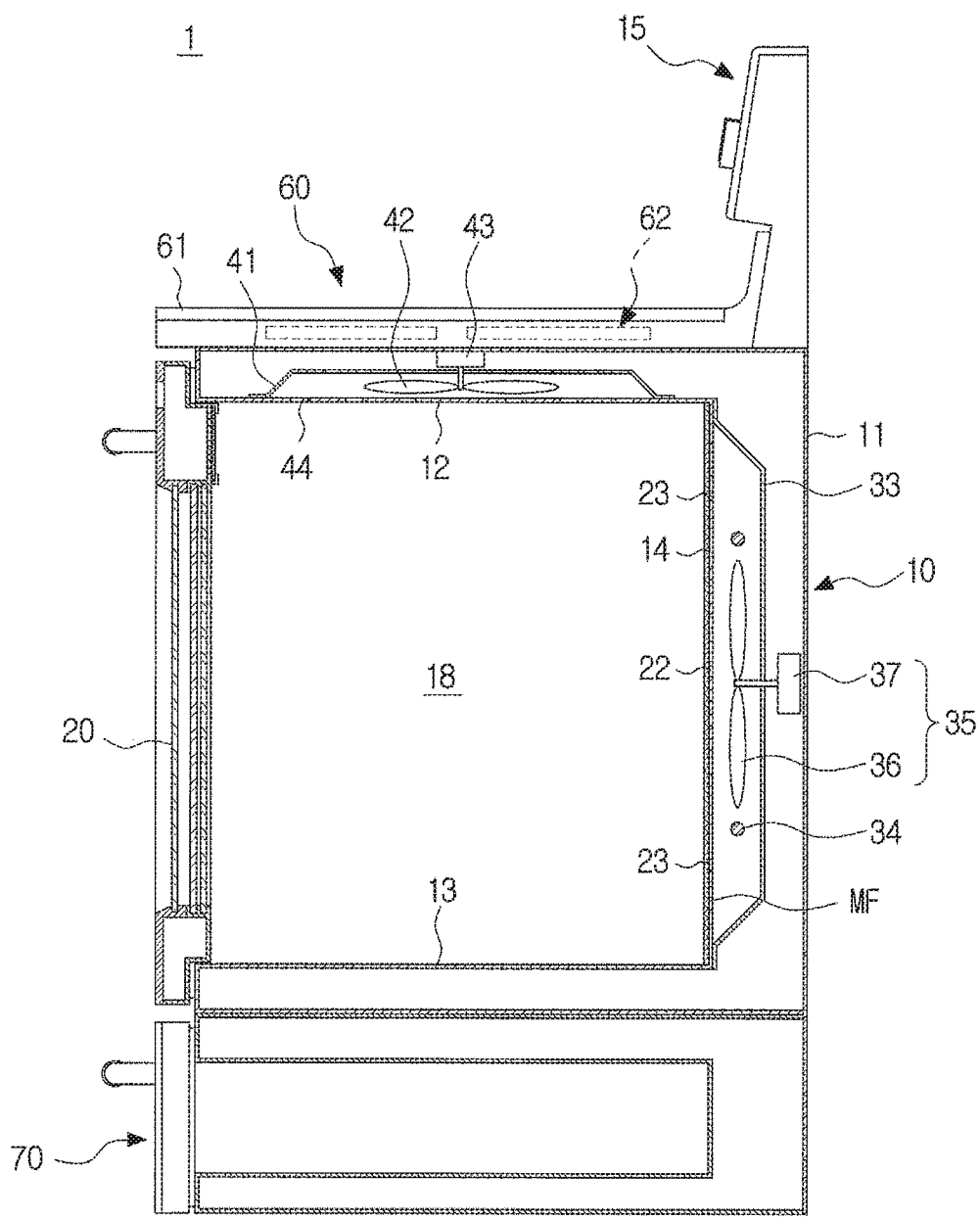
FIG. 31 is a view illustrating a configuration of a cooking apparatus in which a metal foam is mounted on a rear plate of a main body.

FIG. 31 is a view illustrating a configuration of a cooking apparatus 1 in which a metal foam MF is mounted on a rear plate 14 of a main body 11.

Referring to FIG. 31, at least one metal foam MF may be provided around suction holes 22 and discharge holes 23 of the rear plate 14 of the main body 11. When the metal foam MF is mounted in a manner as in FIG. 31, contaminants contained in cooking gas introduced in a direction of convection fan 36 may be mostly adsorbed and decomposed. Consequently, a contamination throughput may be increased.

Figure 32:
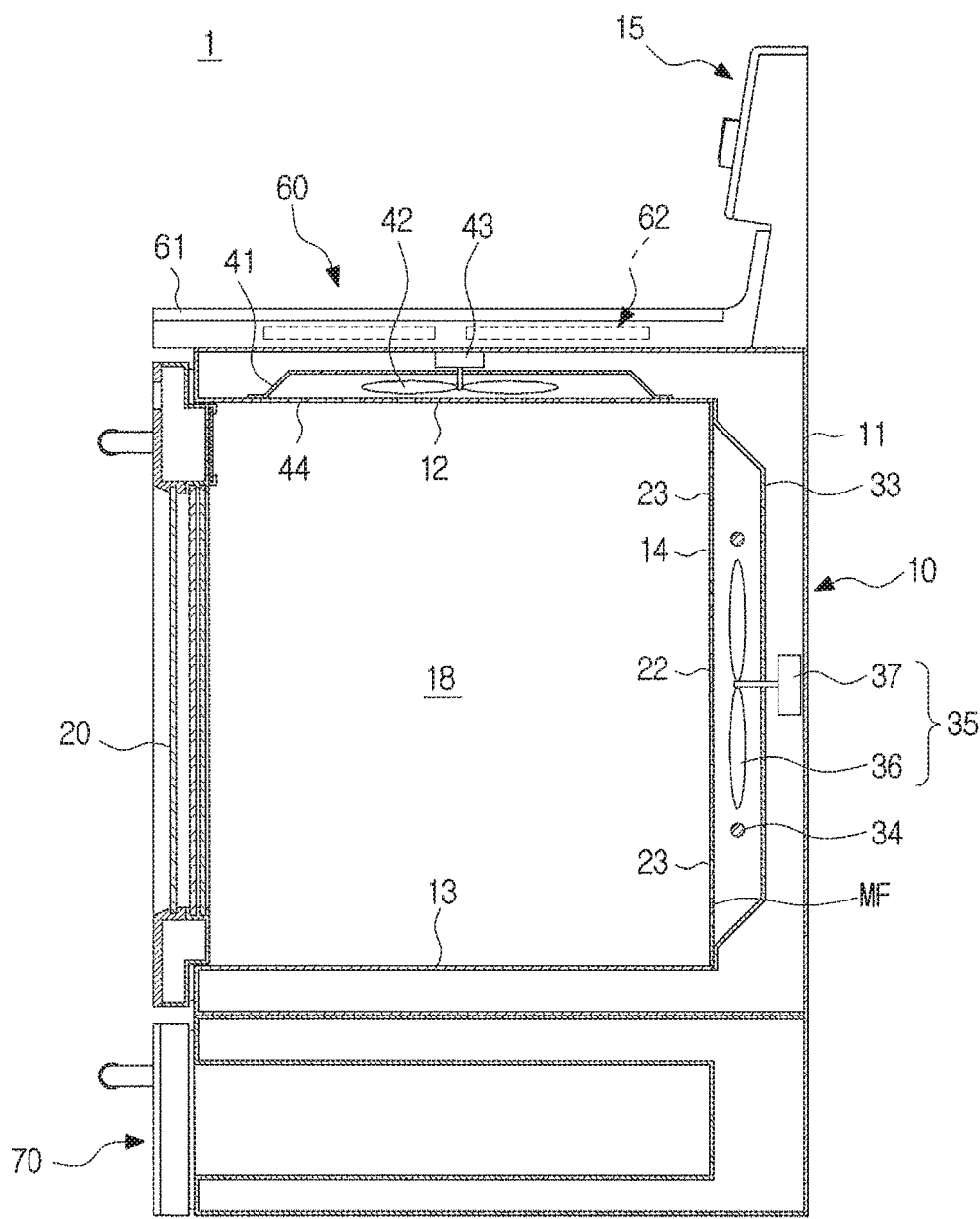
FIG. 32 is a view illustrating a configuration of a cooking apparatus in which a rear plate of a main body is formed as a metal foam.

FIG. 32 is a view illustrating a configuration of a cooking apparatus 1 in which a rear plate 14 of a main body 11 is formed as a metal foam MF.

Referring to FIG. 32, in the cooking apparatus 1, the entirety of the rear plate 14 may be formed as the metal foam MF unlike the metal foam MF of FIG. 31. When the rear plate 14 is formed as the metal foam MF in a manner as in FIG. 32, a reactive surface area in which contaminants contained in cooking gas are adsorbed and decomposed may be maximally formed. Consequently, a contamination throughput may be maximized. In addition, a decomposition reaction may be induced from all of suction holes 22 and discharge holes 23, thereby enabling decomposition efficiency to be maximally increased.

Figure 33:
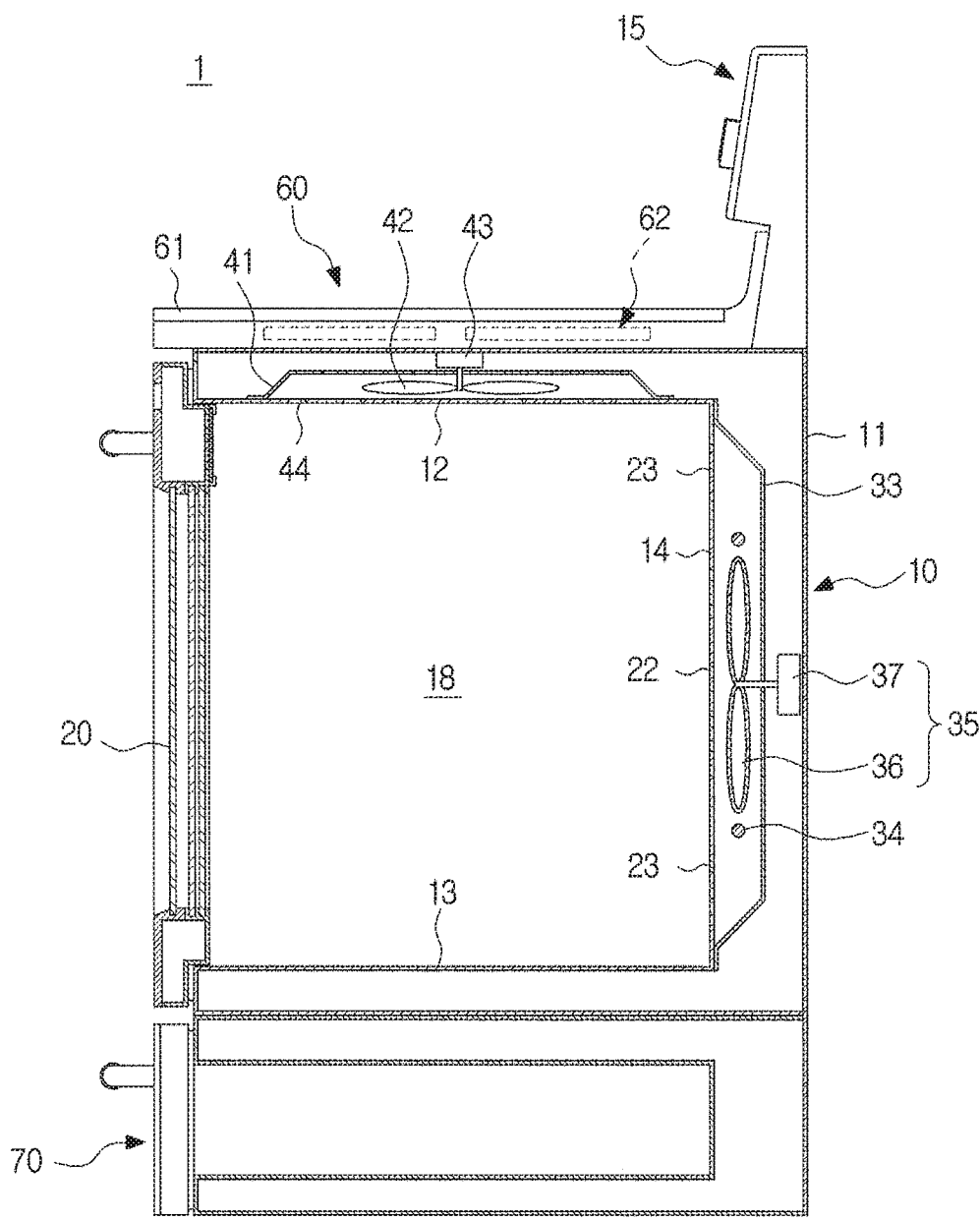
FIG. 33 is a view illustrating a configuration of a cooking apparatus in which a metal foam is attached on a surface of a convection fan.
Figure 34:
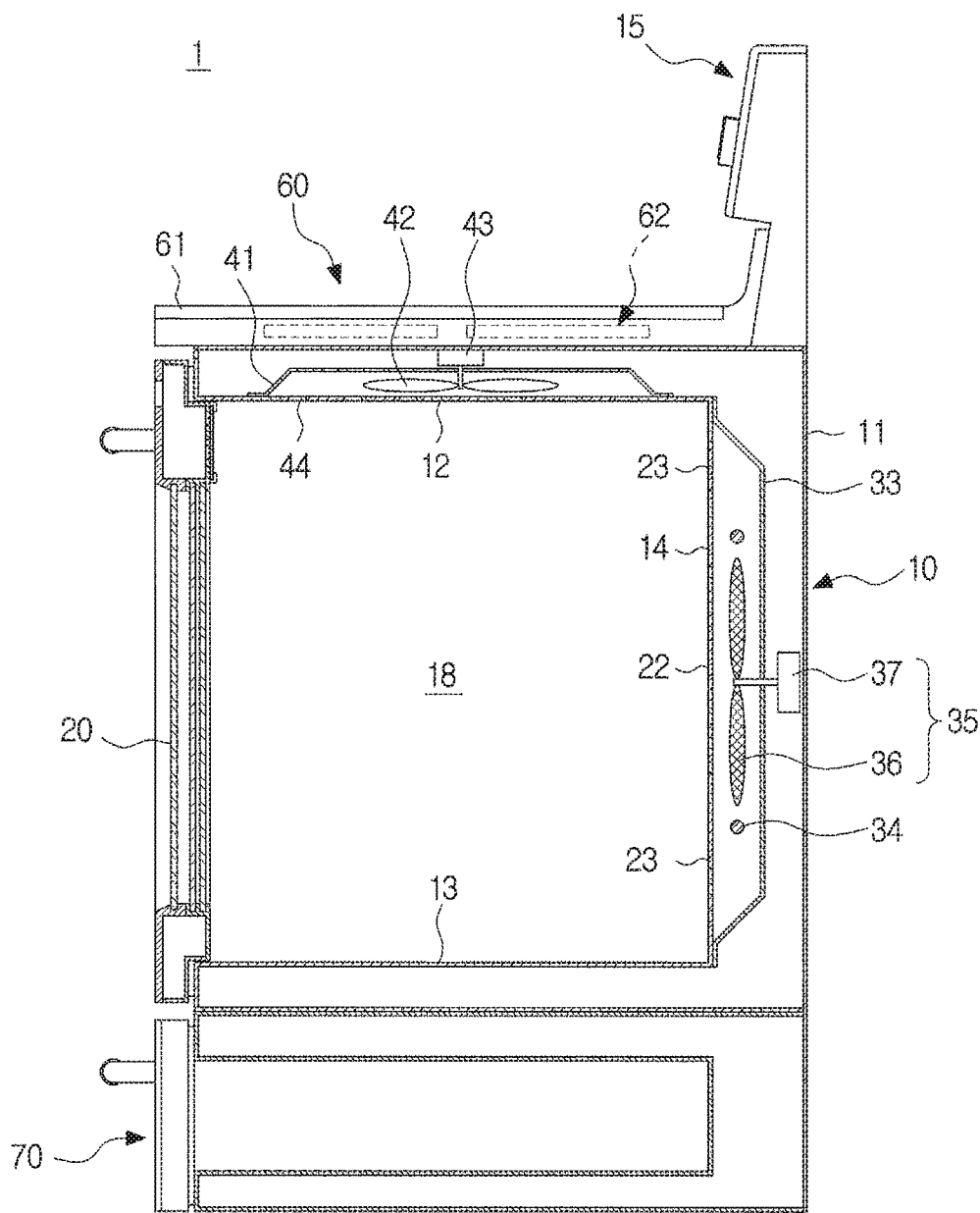
FIG. 34 is a view illustrating a configuration of a cooking apparatus in which a convection fan is formed as a metal foam.

FIG. 33 is a view illustrating a configuration of a cooking apparatus 1 in which a metal foam MF is attached on a surface of a convection fan 36. FIG. 34 is a view illustrating a configuration of a cooking apparatus 1 in which a convection fan 36 is formed as a metal foam MF.

Referring to FIGS. 33 and 34, a convection system has a structure in which a cylindrical heater 34 surrounds the convection fan 36. Accordingly, even when the metal foam MF is attached on the surface of the convection fan 36 or the convection fan 36 itself is formed as the metal foam MF, it may be possible to obtain a similar effect to that of the cooking apparatus 1 of FIG. 24 in which the cylindrical metal foam MF is directly mounted on the surface of the heater 34. However, the cooking apparatus 1 of FIGS. 33 and 34 has an advantage of preventing direct contact between the heater 34 and the metal foam MF.

The cooking apparatus 1 including the metal foam MF and the method of controlling the same have been described above. Next, a cooking apparatus 1 including all of a filter 50 and metal foams MF and a method of controlling the same will be described.

Figure 35:
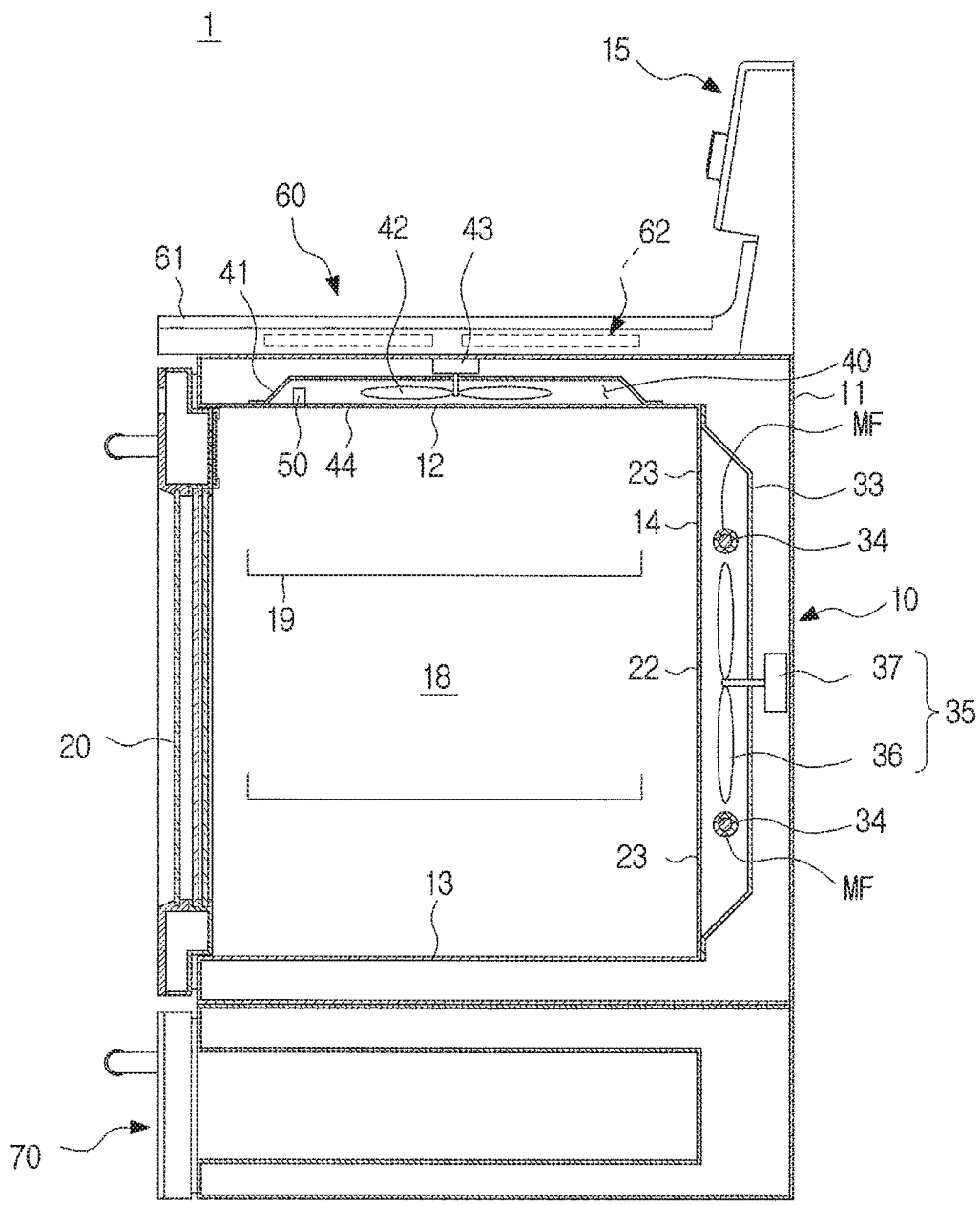
FIG. 35 is a view illustrating a configuration of a cooking apparatus including all of a filter and metal foams.

FIG. 35 is a view illustrating a configuration of the cooking apparatus 1 including all of the filter 50 and the metal foams MF.

As shown in FIG. 35, the cooking apparatus 1 may include an oven 10, a cooktop 60, and a drawer 70. Since the cooktop 60 and the drawer 70 are substantially identical to those of FIGS. 2 and 24, the redundant description thereof will be omitted.

The oven 10 is installed beneath of the cooktop 60 to cook food using heat convection.

The oven 10 may include a main body 11 having a cooking chamber 18 formed therein, a heating source to heat air in the cooking chamber 18 of the main body 11, a vent unit 40 configured to discharge gas in the cooking chamber 18 to the outside of the main body 11, a filter 50 installed in at least one of the cooking chamber 18 and the vent unit 40 to collect gas generated in the cooking chamber 18, and metal foams MF which are installed around the heating source to collect and decompose cooking gas generated in a cooking process. Since the main body 11, the heating source, the vent unit 40, the filter 50, and the metal foams MF may be identical to those of the above-mentioned embodiments, the redundant description thereof will be omitted below.

Since the cooking apparatus 1 according to the embodiment simultaneously includes the filter 50 and the metal foams MF, gas or particles generated in the cooking process and cleaning process may be simultaneously collected or decomposed.

In addition, the cooking apparatus is designed such that the temperature control cleaning process for each operation illustrated in FIGS. 17, 20, and 21, the blockage state detection process of the filter 50 illustrated in FIG. 22, the deodorization process of contaminants in the cooking chamber 18 illustrated in FIG. 28, and the like are individually or simultaneously performed. Consequently, it may be possible to collect and/or decompose gas and/or particles generated in the cooking and cleaning processes. The redundant description related to the same will be omitted.

As is apparent from the above description, a cooking apparatus in accordance with the embodiments of the present disclosure may have the following effects.

First, the cooking apparatus of the present disclosure may decompose liquid-phase oil mist as well as gas-phase oil mist by mounting a metal foam as a gas treatment system in a convection flow unit having large fluidity.

In addition, the gas-phase and liquid-phase oil mist may be decomposed in real time even under hot conditions by coating a high-temperature catalyst on a surface of the metal foam.

Although the cooking apparatus 1 and the method of controlling the same have been shown and described, it would be appreciated by those skilled in the art that changes may be made in these embodiments without departing from the principles and spirit of the disclosure, the scope of which is defined in the claims and their equivalents.

What is claimed is:

1. A method of controlling a cleaning process of a cooking apparatus including a cooking chamber and a temperature sensor to detect a temperature in the cooking chamber, comprising:
controlling a heat source to increase a current temperature in the cooking chamber to a preset first temperature;
controlling the heat source to maintain the preset first temperature in the cooking chamber to burn contaminants in the cooking chamber until a preset first time elapses;
controlling the heat source to automatically increase the maintained preset first temperature in the cooking chamber to a preset second temperature which is higher than the preset first temperature in response to an elapse of the preset first time;
controlling the heat source to maintain the preset second temperature in the cooking chamber to burn contaminants that have not been burned during the preset first time until a preset second time elapses:
controlling the heat source to automatically increase the maintained preset second temperature in the cooking chamber to a preset third temperature which is higher than the preset second temperature in response to an elapse of the preset second time; and
controlling the heat source to maintain the preset third temperature in the cooking chamber to burn contaminants in the cooking chamber that have not been burned during the preset first time and the preset second time until a preset third time elapses.

2. The method according to claim 1, wherein each of the preset first time and the preset second time is five minutes or more.

3. The method according to claim 1, wherein the preset first temperature has a range of 250° C. to 300° C.

4. The method according to claim 3, wherein the preset second temperature has a range of 300° C. to 430° C.

5. The method according to claim 1, further comprising:
controlling the heat source to automatically increase the maintained preset third temperature in the cooking chamber to a preset fourth temperature which is higher than the preset third temperature in response to an elapse of the preset third time; and
controlling the heat source to maintain the preset fourth temperature in the cooking chamber to burn contaminants in the cooking chamber that have not been burned in the preset first time, the preset second time and the preset third time until a preset fourth time elapses.

6. The method according to claim 1, wherein the third preset time is thirty minutes or more.

7. The method according to claim 5, wherein the third preset time is five minutes or more, and the fourth preset time is thirty minutes or more.

8. The method according to claim 4, wherein the preset third temperature has a range of 430° C. to 450° C.

9. The method according to claim 5, wherein the preset first temperature has a range of 250° C. to 300° C., the preset second temperature has a range of 300° C. to 350° C., the preset third temperature has a range of 350° C. to 430° C., and the preset fourth temperature has a range of 430° C. to 450° C.

10. A method of controlling a multi-stage cleaning process of a cooking apparatus including a cooking chamber and a temperature sensor to detect a temperature in the cooking chamber, comprising:
performing a first stage cleaning process, the first stage cleaning process comprising:

controlling a heat source to increase a current temperature in the cooking chamber to a preset first temperature; and controlling the heat source to maintain the preset first temperature in the cooking chamber to burn contaminants in the cooking chamber until a preset first time elapses to complete the first stage cleaning process; and automatically performing a second stage cleaning process after completing the first stage cleaning process, the second stage cleaning process comprising:

controlling the heat source to automatically increase the maintained preset first temperature in the cooking chamber to a preset second temperature which is higher than the preset first temperature in response to an elapse of the preset first time; and controlling the heat source to maintain the preset second temperature in the cooking chamber to burn contaminants in the cooking chamber that have not been burned in the first stage cleaning process until a preset second time elapses to complete the second stage cleaning process; automatically performing a third stage cleaning process after completing the second stage process, the third stage cleaning process comprising:

controlling the heat source to automatically increase the maintained preset second temperature in the cooking chamber to a preset third temperature which is higher than the preset second temperature in response to an elapse of the preset second time; and controlling the heat source to maintain the preset third temperature to burn contaminants in the cooking chamber that have not been burned in the first stage cleaning process and the second stage cleaning process until a preset third time elapses to complete the third stage cleaning process.

11. The method according to claim 10, further comprising:

automatically performing a third fourth stage cleaning process after completing the second third stage process, the third fourth stage cleaning process comprising:

controlling the heat source to automatically increase the maintained preset second third temperature in the cooking chamber to a preset third fourth temperature which is higher than the preset second third temperature in response to an elapse of the preset second third time; and controlling the heat source to maintain the preset third fourth temperature in the cooking chamber to burn contaminants in the cooking chamber that have not been burned in the first stage cleaning process, the second stage cleaning process and the third stage cleaning process until a preset third fourth time elapses to complete the third fourth stage cleaning process.

12. The method according to claim 10, wherein the preset first temperature has a range of 250° C. to 300° C., the preset second temperature has a range of 300° C. to 430° C., and the preset third temperature has a range of 430° C. to 450° C.

13. The method according to claim 11, wherein the preset first temperature has a range of 250° C. to 300° C., the preset second temperature has a range of 300° C. to 350° C., the preset third temperature has a range of 350° C. to 430° C., and the preset fourth temperature has a range of 430° C. to 450° C.

14. The method according to claim 10, wherein the third preset time is thirty minutes or more.

15. The method according to claim 11, wherein the third preset time is five minutes or more, and the fourth preset time is thirty minutes or more.

* * * * *